(12) United States Patent
Beard et al.

(10) Patent No.: US 11,994,153 B2
(45) Date of Patent: May 28, 2024

(54) HYDRAULIC CONTROL COMPONENTS FOR OIL WELL BLOWOUT PREVENTERS

(71) Applicant: PacSeal Group, Inc., Brea, CA (US)

(72) Inventors: Joseph O. Beard, Fullerton, CA (US); Frode Sveen, Chino, CA (US); Douglas W. Beard, Brea, CA (US)

(73) Assignee: PacSeal Group, Inc., Brea, CA (US)

( * ) Notice: Subject to any disclaimer, the term of this patent is extended or adjusted under 35 U.S.C. 154(b) by 0 days.

(21) Appl. No.: 18/122,973

(22) Filed: Mar. 17, 2023

(65) Prior Publication Data

US 2023/0220854 A1     Jul. 13, 2023

Related U.S. Application Data

(62) Division of application No. 16/857,745, filed on Apr. 24, 2020, now Pat. No. 11,614,104.

(60) Provisional application No. 62/839,335, filed on Apr. 26, 2019.

(51) Int. Cl.
| | |
|---|---|
| *E21B 33/06* | (2006.01) |
| *F15B 1/02* | (2006.01) |
| *F15B 13/02* | (2006.01) |
| *F15B 13/04* | (2006.01) |
| *F16K 11/07* | (2006.01) |

(52) U.S. Cl.
CPC .......... *F15B 13/0402* (2013.01); *E21B 33/06* (2013.01); *F15B 1/02* (2013.01); *F15B 13/025* (2013.01); *F16K 11/0716* (2013.01)

(58) Field of Classification Search
CPC ......... E21B 33/06–064; F15B 13/0402; F16K 11/0716; Y10T 137/87169; Y10T 137/87193

See application file for complete search history.

(56) References Cited

U.S. PATENT DOCUMENTS

| | | |
|---|---|---|
| 2,696,219 A | 12/1954 | Barksdale |
| 3,134,405 A | 5/1964 | White |
| 3,917,220 A | 11/1975 | Gilmore |
| 3,949,966 A | 4/1976 | Fabish |
| 4,059,657 A | 11/1977 | Hay |
| 4,148,460 A | 4/1979 | Kinsler |
| 4,274,445 A | 6/1981 | Cooper |
| 4,858,882 A | 8/1989 | Beard et al. |
| 4,930,745 A | 6/1990 | Granger et al. |
| 4,949,785 A | 8/1990 | Beard et al. |
| 5,044,603 A | 9/1991 | Granger et al. |
| 5,056,418 A | 10/1991 | Granger et al. |
| 5,116,017 A | 5/1992 | Granger et al. |
| 5,123,449 A | 6/1992 | Nowicki |
| 5,285,997 A | 2/1994 | Holloway |
| 5,944,051 A | 8/1999 | Johnson |
| 7,404,543 B2 | 7/2008 | Weston |

(Continued)

*Primary Examiner* — Kevin F Murphy
(74) *Attorney, Agent, or Firm* — Knobbe, Martens, Olson & Bear, LLP

(57) ABSTRACT

A hydraulic control system for blowout preventers systems, frack valves and chokes, and related wellhead and control equipment used in oil and gas well drilling operations. The hydraulic control system can include one or more hydraulic control valves or pressure regulators including an internal, linear slider and pairs of seal rings. Lapped and polished surfaces of the seal rings and sliders can form a dynamic metal-to-metal seal within the hydraulic control valves or pressure regulators.

8 Claims, 28 Drawing Sheets

(56) References Cited

U.S. PATENT DOCUMENTS

| | | | |
|---|---|---|---|
| 7,503,344 | B2 | 3/2009 | Pili et al. |
| 8,464,525 | B2 | 6/2013 | Springett et al. |
| 8,490,705 | B2 | 7/2013 | Curtiss |
| 9,291,036 | B2 | 3/2016 | Baugh |
| 9,587,454 | B1 | 3/2017 | Beard et al. |
| 9,879,504 | B1 | 1/2018 | Beard et al. |
| 9,982,511 | B2 | 5/2018 | Weintraub et al. |
| 10,234,055 | B2 | 3/2019 | Bertrem et al. |
| 10,458,556 | B2 | 10/2019 | Schulz |
| 2019/0003610 | A1* | 1/2019 | Lucidera ............ F16K 11/0716 |
| 2020/0386068 | A1 | 12/2020 | Beard et al. |

* cited by examiner

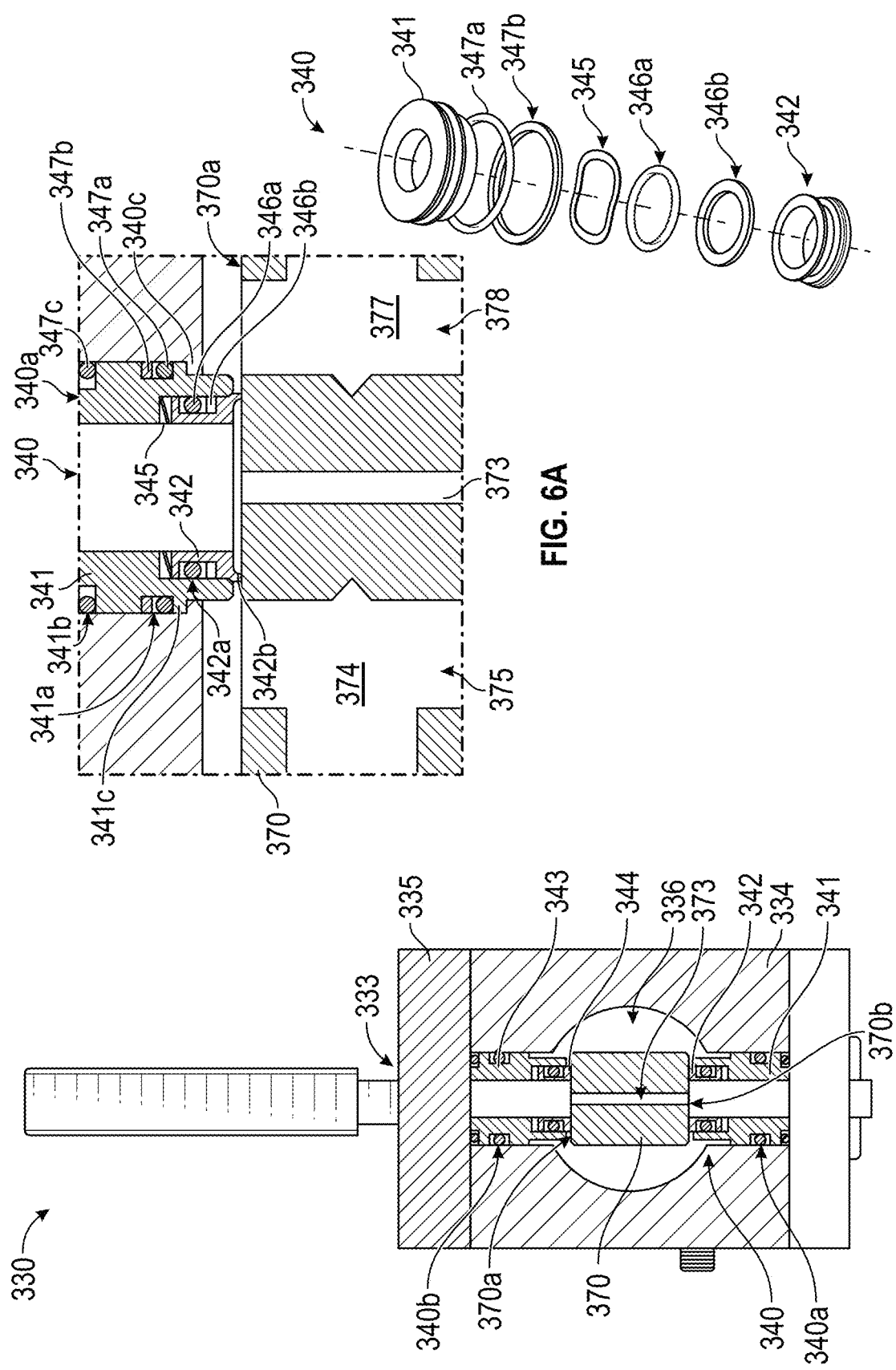

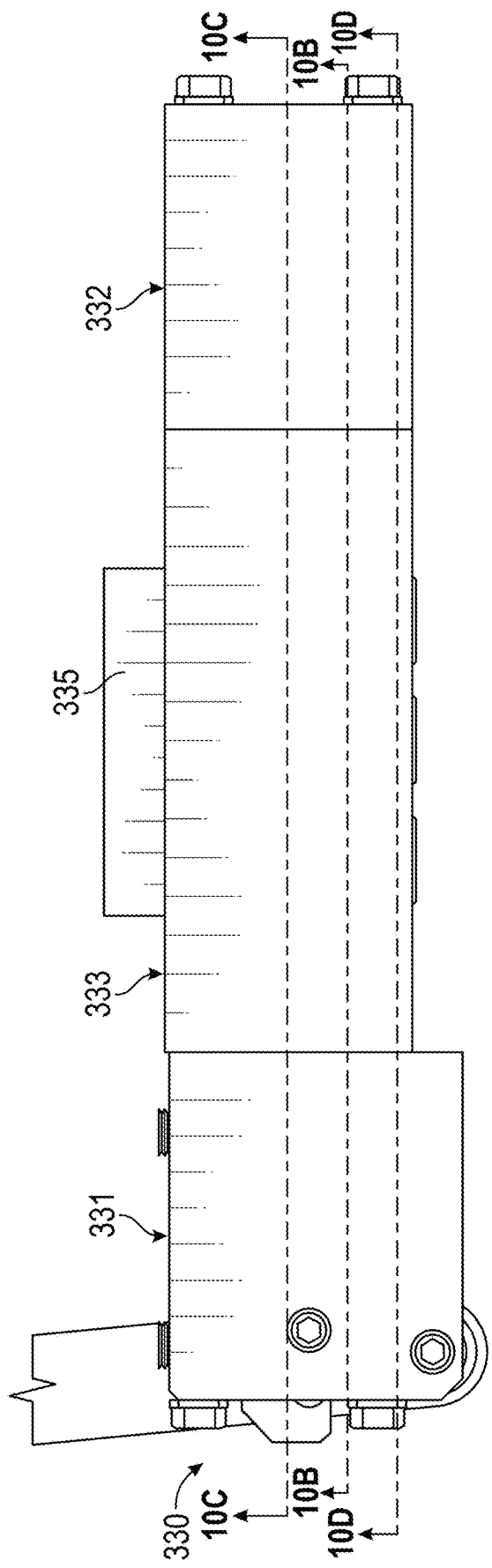
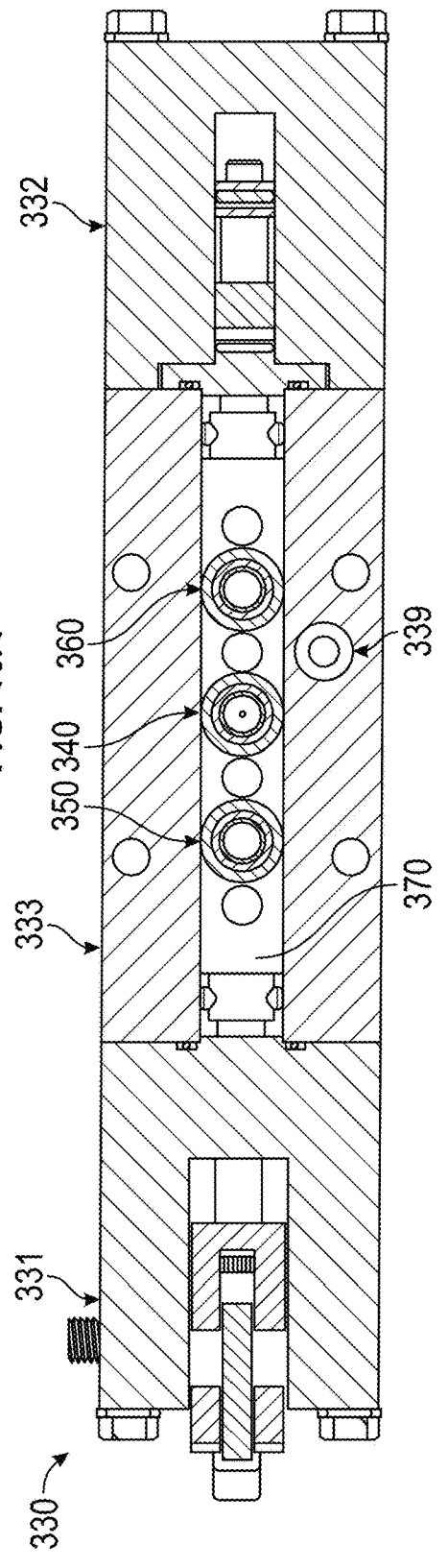
FIG. 10A
FIG. 10B

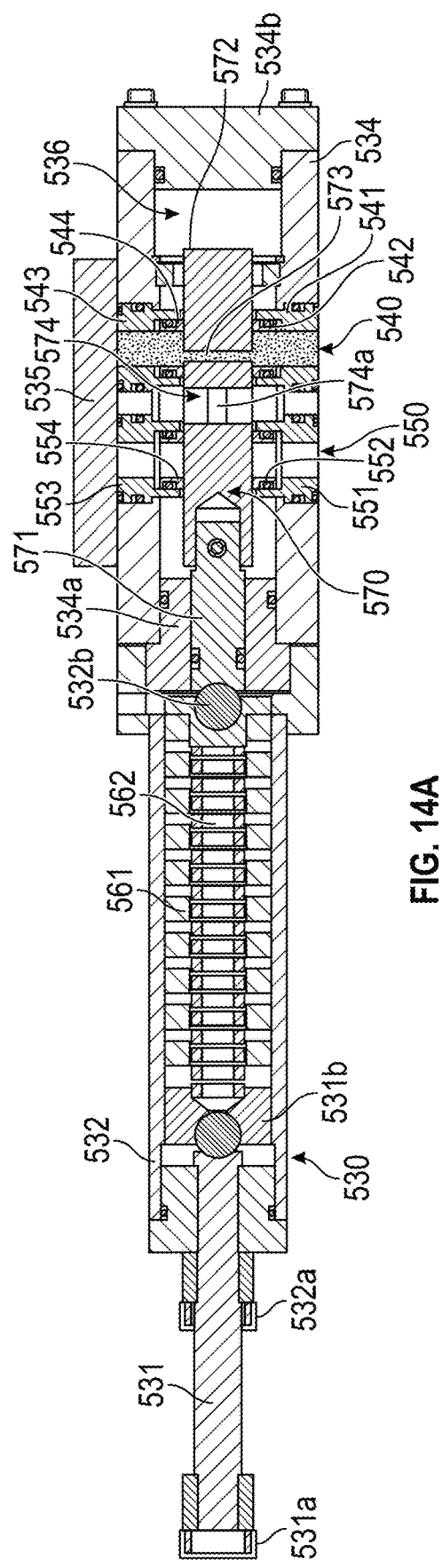
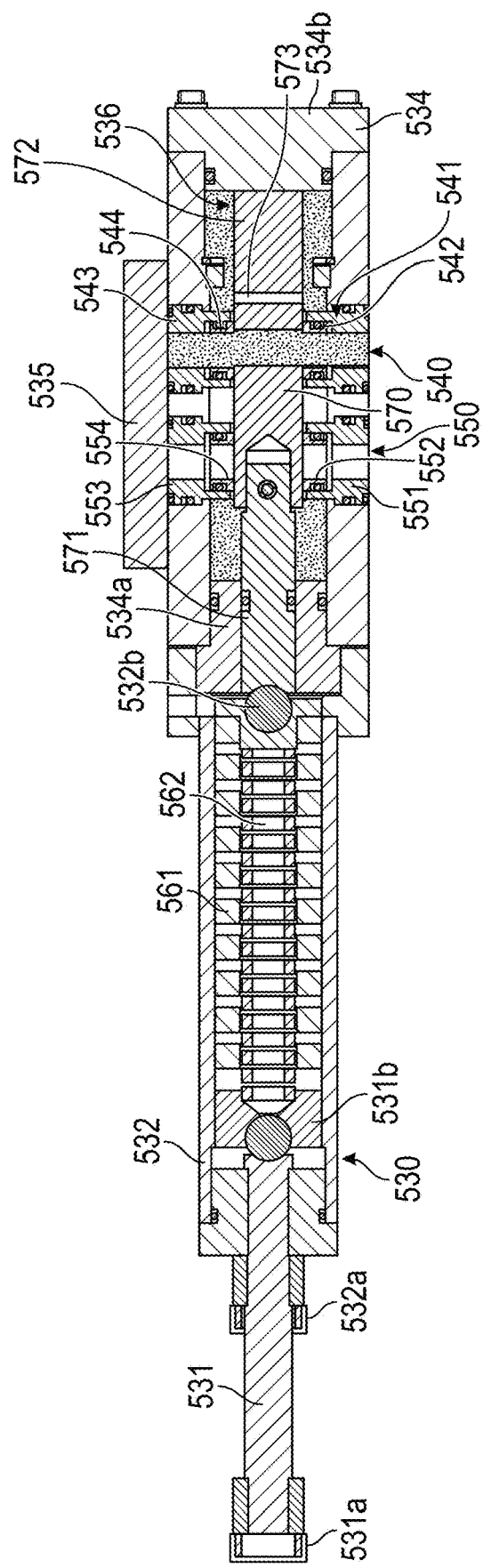
FIG. 14A
FIG. 14B

HYDRAULIC CONTROL COMPONENTS FOR OIL WELL BLOWOUT PREVENTERS

CROSS-REFERENCE

This application is a divisional of U.S. patent application Ser. No. 16/857,745, filed Apr. 24, 2020, which claims benefit of Provisional Application No. 62/839,335 filed on Apr. 26, 2019, the entirety of which are hereby incorporated by reference.

BACKGROUND

Field

This disclosure generally relates to a hydraulic control system for blowout preventers systems, frack valves and chokes, and related wellhead and control equipment used in oil and gas well drilling operations, hereinafter referred to generally as blowout preventers (BOP).

Related Art

Oil and gas wells are used to recover subterranean fossil fuels. The fossil fuels can be accessed by drilling a well into the ground using a rotating drill string tipped with a drill head. The drill string can include lengths of threaded pipes that are fitted together and coupled with a rotary engine. The drill bit head can bore through solid rock and soil to form a well bore. The well bore may also be encased in concrete. During drilling operations, a specially formulated mud is introduced into an annular space (annulus) between the drill string and a wall of the well bore (or casing). The mud is pumped downward through the interior of the pipe and out through holes or jets near the drill bit head. The mud returns to the surface within the annulus carrying drill cuttings (e.g., rock chips) and also acts to lubricate the rotating drill string.

The mud within the well bore also provides a downward hydrostatic pressure that counteracts any pressure (e.g., from gas pockets) that may be encountered in subsurface geological structures. However, the pressure in some of the subsurface gas pockets can be greater than the hydrostatic pressure of the column of mud contained in the annulus of the well bore. To prevent an explosive and potentially dangerous release of gas and/or liquid out of the well bore, the drill string can be equipped with a blowout preventer (BOP). Several BOPs are typically arranged in a stack located at an upper end of the well bore. The BOP stack can be mounted over the drill string and shuts off flow through the annulus and/or drill string.

The BOP stack can include several different types of BOPs used to shut off flow within the annulus and/or within the drill string itself. A typical BOP stack can includes an annular BOP and different ram BOPs (e.g., shear, pipe). An annular BOP includes a resilient sealing cushion which can be inflated by hydraulic action into compressive sealing contact with an outer circumference of the drillstring to close the annulus. Similarly, a pipe ram BOP includes a pair of rams that, when actuated, abut the drill string to seal the annulus. A shear ram BOP includes a pair of rams that, when actuated, shear through the drill string and also block the annulus, thus cutting off all flow within the drill string. Each of the various BOPs in the BOP stack can be controlled independently by a hydraulic control system.

SUMMARY

According to one aspect of the present invention is a BOP stack coupled with a drill string includes a hydraulic pump and a motor for powering the hydraulic pump, a pressure accumulator tank for providing a flow of pressurized hydraulic fluid to a BOP. The BOP includes an actuator that is operable by the flow of pressurized hydraulic fluid. A hydraulic control system includes a linear shear flow controller for delivering the flow of pressurized hydraulic fluid to the actuator of the BOP.

The linear shear flow controller includes a housing with an housing around an interior space. A first port includes first and second apertures in the housing, a first ring holder disposed in the first aperture and a first seal ring coupled within the first ring holder. A second ring holder is disposed in the second aperture and a second seal ring couples within the second ring holder. A second port includes third and fourth apertures in the housing. A third ring holder is disposed in the third aperture and the third ring seal couples within the third ring holder. A fourth ring holder is disposed in the fourth aperture and a fourth seal ring couples within a fourth ring holder. A supply port receives the flow of pressurized hydraulic fluid and includes fifth and sixth apertures in the housing. A fifth ring holder is disposed in the fifth aperture and a fifth seal ring is coupled within the fifth ring holder. A sixth ring holder is disposed in the sixth aperture and the sixth seal ring couples within the sixth ring holder. A return port includes an aperture within the outer housing and is in communication with the interior space.

A slide is disposed within the interior space and is movable along a linear axis. The slide includes a first side and a second side on opposite sides. The slide includes a center aperture, a first pair of valve apertures on a first end and a second pair of valve apertures on a second end of the slide. The first side of the slide sealingly engages with the first, third, and fifth sealing rings, and the second side of the slide sealingly engages with the second, fourth, and sixth sealing rings. The slide is slideable along the linear axis between first, second, and blocked positions.

In the blocked position of the slide, the center aperture is aligned with the supply port. In the first position of the slide, the first pair of valve apertures are aligned, respectively, with the supply port and the first port to form a first flow path for the flow of pressurized hydraulic fluid to the actuator of the BOP, and the second pair of valve apertures are aligned, respectively, with the second port and the interior space to form a first return flow path for the flow of pressurized hydraulic fluid from the actuator of the BOP. In the second position of the slide, the second pair of valve apertures are aligned, respectively, with the supply port and the second port to form a second flow path for the flow of pressurized hydraulic fluid to the actuator of the BOP, and the first pair of valve apertures are aligned, respectively, with the first port and the interior space to form a second return flow path for the flow of pressurized hydraulic fluid from the actuator of the BOP.

According to another aspect of the present invention is a BOP stack coupled with a drill string includes a hydraulic pump and a motor for powering the hydraulic pump, a pressure accumulator tank for providing a flow of pressurized hydraulic fluid to a BOP. The BOP includes an actuator that is operable by the flow of pressurized hydraulic fluid. A hydraulic control system includes a linear shear flow pressure regulating and reducing valve for delivering the flow of pressurized hydraulic fluid to the actuator of the BOP.

According to another aspect of the present invention is a BOP stack coupled with a drill string includes a hydraulic pump and a motor for powering the hydraulic pump, a pressure accumulator tank for providing a flow of pressurized hydraulic fluid to a BOP. The BOP includes an actuator that is operable by the flow of pressurized hydraulic fluid. A hydraulic control system includes a linear shear flow pressure regulating and reducing valve for delivering the flow of pressurized hydraulic fluid to the actuator of the BOP.

According to another aspect of the present invention is a BOP stack coupled with a drill string includes a hydraulic pump and a motor for powering the hydraulic pump, a pressure accumulator tank for providing a flow of pressurized hydraulic fluid to a BOP. The BOP includes an actuator that is operable by the flow of pressurized hydraulic fluid. A hydraulic control system includes a subplate mounted linear shear flow cartridge valve for delivering the flow of pressurized hydraulic fluid to the actuator of the BOP.

According to another aspect of the present invention is a BOP stack coupled with a drill string includes a hydraulic pump and a motor for powering the hydraulic pump, a pressure accumulator tank for providing a flow of pressurized hydraulic fluid to a BOP. The BOP includes an actuator that is operable by the flow of pressurized hydraulic fluid. A hydraulic control system includes a subplate mounted linear shear flow pressure regulating and reducing valve for delivering the flow of pressurized hydraulic fluid to the BOP.

BRIEF DESCRIPTION OF THE DRAWINGS

FIG. 5 shows a section view taken along the line 5-5 in FIG. 4A;

FIG. 6A shows a detail of a seal ring of the linear shear flow valve;

FIG. 6B shows an exploded view of a port assembly;

FIG. 10A shows a side view of the linear shear flow valve;

FIG. 10B shows a section view taken along the line 10B-10B in FIG. 10A;

FIG. 14A shows a cross-section of the pressure reducing and regulating valve in a blocked configuration;

FIG. 14B shows a cross-section of the pressure reducing and regulating valve in an open configuration;

DESCRIPTION

The various features and advantages of the systems, devices, and methods of the technology described herein will become more fully apparent from the following description of the embodiments illustrated in the figures. These embodiments are intended to illustrate the principles of this disclosure, and this disclosure should not be limited to merely the illustrated examples. The features of the illustrated embodiments can be modified, combined, removed, and/or substituted as will be apparent to those of ordinary skill in the art upon consideration of the principles disclosed herein.

Figure 1:
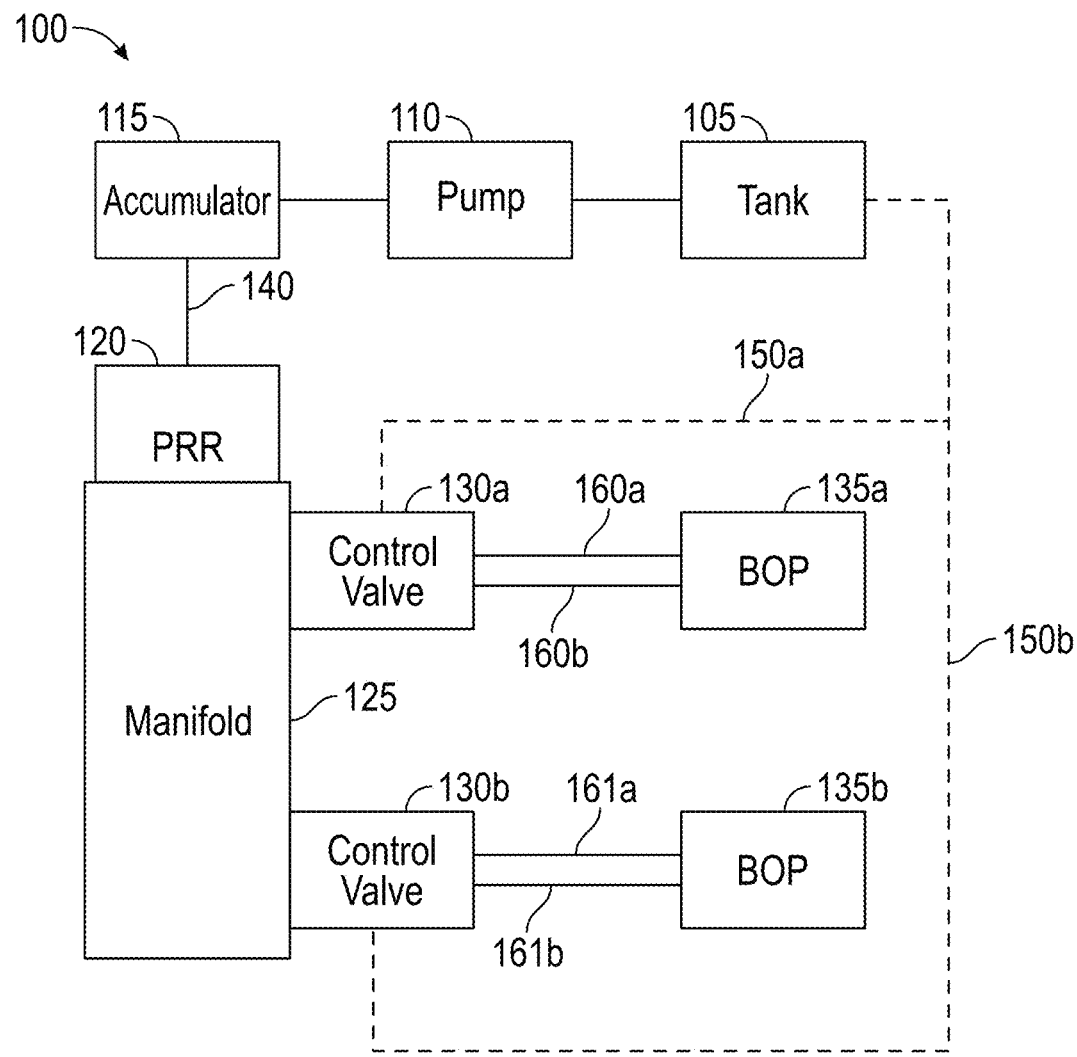
FIG. 1 shows a schematic overview of a BOP assembly.

As described above, BOPs can be used to control the flow of fluids within a well bore during drilling operations. FIG. 1 shows a schematic diagram of a blowout preventer (BOP) assembly 100. The BOP assembly 100 can include hydraulic components common to BOP stacks, as well as innovations of the present disclosure described below. The BOP assembly 100 can include a hydraulic fluid tank 105 for storing a hydraulic fluid (e.g., oil or water/oil emulsion). The hydraulic fluid tank 105 can be coupled with a hydraulic pump 110. The hydraulic pump 110 can be coupled with one or more hydraulic accumulators 115 for delivering the hydraulic fluid thereto. The hydraulic accumulators 115 can store the hydraulic fluid under pressure for delivery to first and second BOPs 135a, 135b as a hydraulic supply fluid. A common type of hydraulic accumulator includes an outer cylinder containing a gas diaphragm. Expansion of the gas diaphragms can provide a positive pressure to the hydraulic fluid stored within the hydraulic accumulators 115.

The hydraulic accumulators 115 can be coupled with a manifold 125 by a supply line 140. First and second control valves 130a, 130b can be coupled with the manifold 125. The first and second control valves 130a, 130b be mounted directly on the manifold 125 (e.g., in a modular arrangement). The manifold 125 can include a supply passageway for delivering the hydraulic supply fluid to the first and second control valves 130a, 130b.

The first control valve 130a can operate an actuator (e.g., hydraulic) of the first BOP 135a. The first control valve 130a can be a three-way valve. The first control valve 130a have a first position and a second position. In the first position, the control valve 130a can direct the hydraulic supply fluid along a first flow path 160a. By directing the hydraulic supply fluid along the first flow path 160a, the BOP 135a can actuate in a first direction (e.g., closing the BOP). In the first position, the control valve 130a can also direct a hydraulic return fluid along a second flow path 160b. By directing the hydraulic return fluid along the second flow path 160b, the actuator of the BOP 135a can be allowed to move in the first direction. In the second position, the control valve 130a can direct the hydraulic supply fluid along the second flow path 160b. By directing the hydraulic supply fluid along the second flow path 160b, the BOP 135a can actuate in a second direction (e.g., opening the BOP). In the second position, the control valve 130a can also direct a hydraulic return fluid along the first flow path 160a. By directing the hydraulic return fluid along the first flow path 160a, the actuator of the BOP 135a can be allowed to move in the second direction. The first control valve 130a can also include a blocked position in which the hydraulic supply is blocked from flow along either the first or second flow paths 160a, 160b.

The first and second flow paths 160a, 160b can be coupled with the control valve 130a. The first and second flow paths 160a, 160b can pass through the manifold 125. The manifold 125 can include multiple passageways for routing the first and second flow paths 160a, 160b through the manifold 125 and the control valve 130a.

In the first and second positions of the first control valve 130a, the hydraulic return fluid (through either the first or second flow paths 160a, 160b) can be directed along a return flow path 150a. The return flow path 150a can connect with the tank 105 or alternatively be vented to the environment. The return flow path 150a can extend through the first control valve 130a and/or the manifold 125. The manifold 125 can include return passageway for routing the return flow path 150a through the manifold 125. The return flow path 150a can allow the flow of hydraulic fluid back to the tank 105 for recirculation into the hydraulic accumulators 115 via the pump 110.

The second control valve 130b can have the same structure as the first control valve 130a. The second control valve 130b can be a three-way hydraulic actuator coupled with an actuator of the second BOP 135b through first and second flow paths 161a, 161b, and/or a return flow path 150b. In addition, the BOP assembly 100 can include any number of BOPs and corresponding control valves coupled with the manifold 125. The BOPs can be arranged vertically, or in a stack, along the drill string at the upper end of the well bore. The hydraulic control elements (e.g., tank 105, pump 110, manifold 125, control valves 130a, 130b) can be located spaced away from the stack and connected by the flow paths (e.g., flow paths 160a, 160b, 161a, 161b, etc.).

The assembly 100 can include a pressure reducing and regulating valve 120. The pressure reducing and regulating valve 120 can function to lower the pressure of the hydraulic supply fluid entering the manifold 125 and/or control valves 130a, 130b. The pressure reducing and regulating valve 120 can be coupled between the hydraulic accumulators 115 and the control valves 130a, 130b. The pressure regulating and reducing valve 120 can include a vent. The vent can be coupled with the tank 105 or vent to the environment. The vent can allow the flow of excess hydraulic supply fluid back to the tank for recirculation into the accumulator 115 via the pump 110. As one example, the pressure regulating and reducing valve 120 can receive hydraulic fluid in the range of 1,000-6,000 PSI and exit the hydraulic supply fluid at a pressure in the range of 50-5500 PSI.

Figure 2:
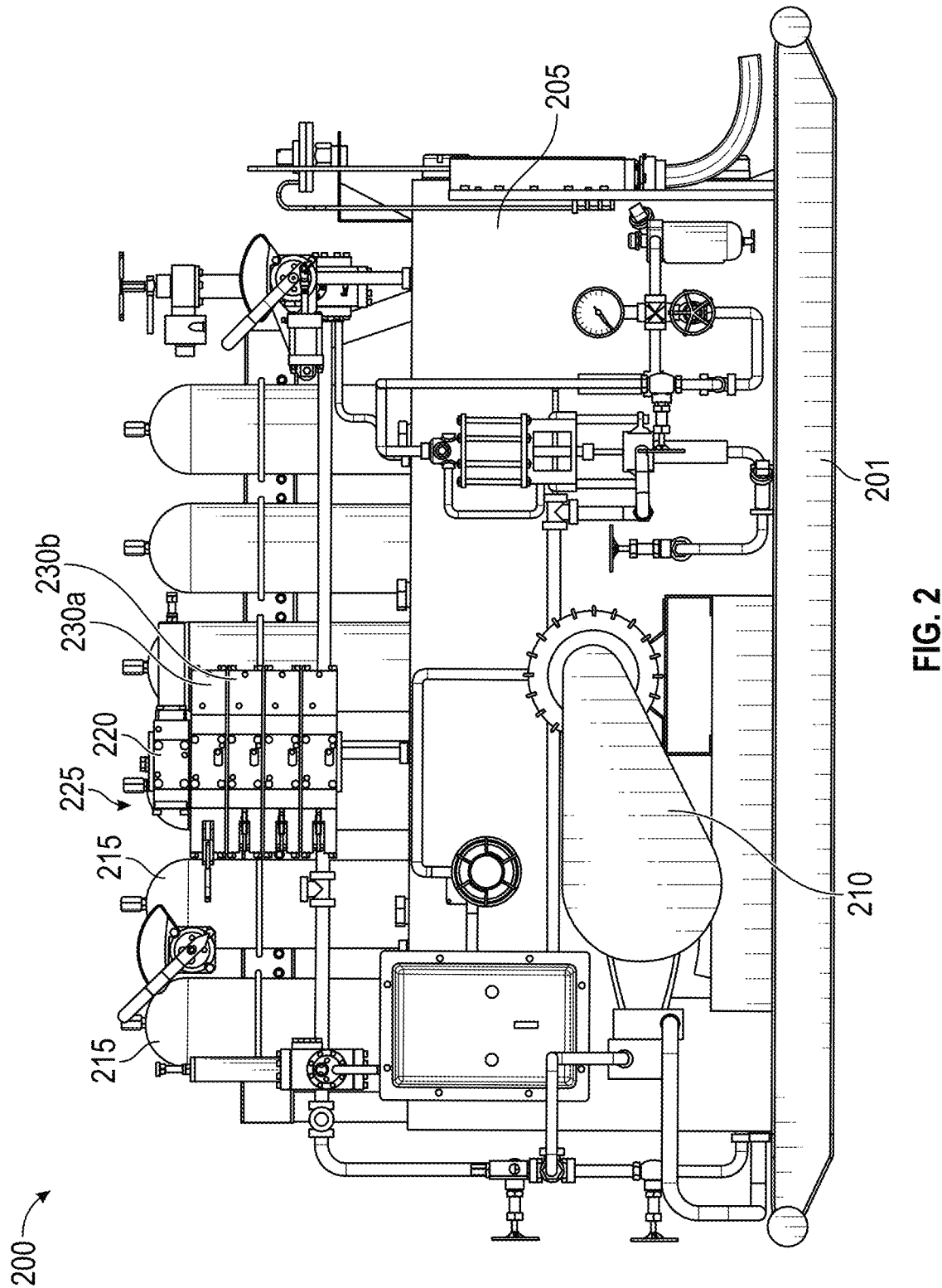
FIG. 2 shows an embodiment of a control assembly for a BOP.

FIG. 2 shows an embodiment of a controller assembly 200 for a BOP stack. The controller assembly 200 can include certain elements of the BOP assembly 100, as described above. Typically, the controller assembly 200 can include hydraulic, electric and other control mechanisms. The controller assembly 200 can include a tank 205 for storing hydraulic fluid, a pump 210 coupled with the tank 205 and one or more hydraulic accumulators 215 coupled with the pump 210. The accumulators can be hydraulically coupled with a valve assembly. The valve assembly can include a pressure reducing and regulating valve 220 and one or more control valves such as the first control valve 230a and a second control valve 230b. The pressure reducing and regulating valve 220 and the control valves 230a, 230b can be coupled together on a common manifold assembly 225. The common manifold assembly 225 can receive a hydraulic supply pressure from the hydraulic accumulator 215. Each of the control valves 230a, 230b can be coupled with a corresponding BOP actuator located remote from the controller assembly 200. The control assembly 200 can be mounted on a skid 201. The skid 201 can be movable and optionally located adjacent to the well bore.

Figure 3A:
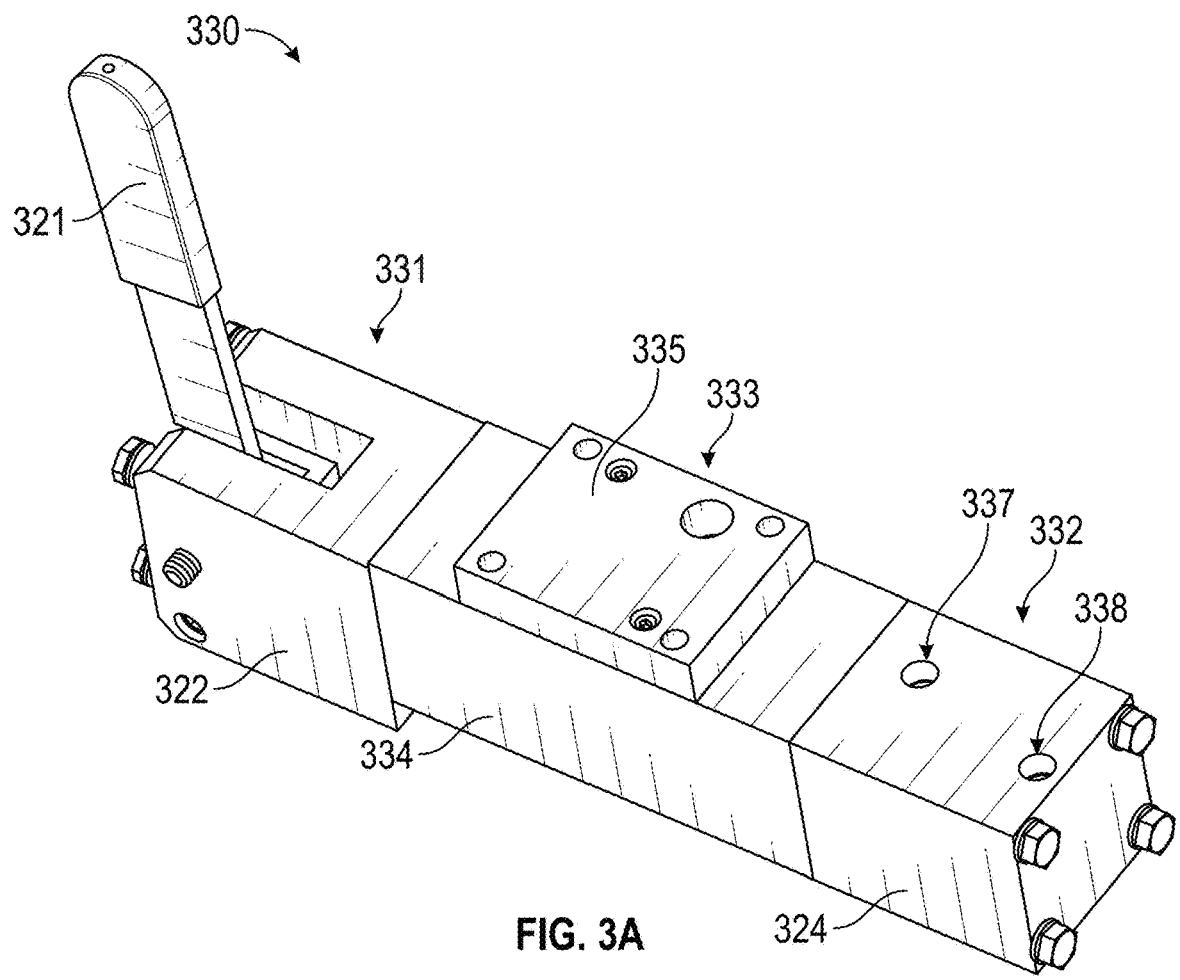
FIG. 3A shows a top perspective view of an embodiment of a linear shear flow valve.

FIG. 3A shows an embodiment of a linear shear flow valve or directional control valve (DCV) 330. The DCV 330 can function as a three-way hydraulic valve like the control valve 130a in the BOP assembly 100 described above. The DCV 330 can include a first end 331, a second end 332, and a valve section 333. The first end 331, second end 332 and the valve section 333 can be coupled together by one or more mechanical fasteners (e.g., bolts). Thus, any of the components of the DCV 330 can be replaceable.

The first end 331 can include a housing 322. The housing 322 can be generally block-shaped. The housing 322 can include one or more planar faces. The handle 321 can be coupled within a cutout portion of the housing 322. The cutout portion can accommodate the lever motion of the handle 321. The first end 331 can include a handle 321. The handle 321 can be connected at one end with a pin for pivoting an outer end of the handle 321 with respect to the housing 322 of the DCV 330. The handle 321 can function to actuate the DCV 330 as described further below.

The second end 332 can include a housing 324. The housing 324 can be generally block-shaped having one or more planar faces. The first and second pilot holes 337, 338 can be located in the same planar face or different planar faces. The second end 332 can include a double acting piston actuatable via a first pilot hole 337 and a second pilot hole 338. The pilot holes 337/338 can be coupled with a hydraulic control system or other pilot line (e.g. pneumatic). The second end 332 can be used to actuate the DCV 330 as a second control means in addition to the handle 321.

The valve section 333 can include a housing 334. The housing 334 can be generally block-shaped. A first end of the housing 334 can be coupled with the housing 322 of the first end 331. A second end of the housing 334 can be coupled with the housing 324 of the second end 332. The housing 334 can include one or more planar faces. A plate 335 can be coupled with an upper face of the housing 334. The plate 335 can be attached via one or more mechanical fasteners (e.g. bolts, screws or the like). The housing 322 can be coupled with the housing 334 through one or more mechanical fasteners. The housing 324 can be coupled with the housing 334 through one or more mechanical fasteners. The composition of the DCV 330 can be modular with any of the components of the first end 331, the second end 332 or the valve section 333 being replaceable.

Figure 3B:
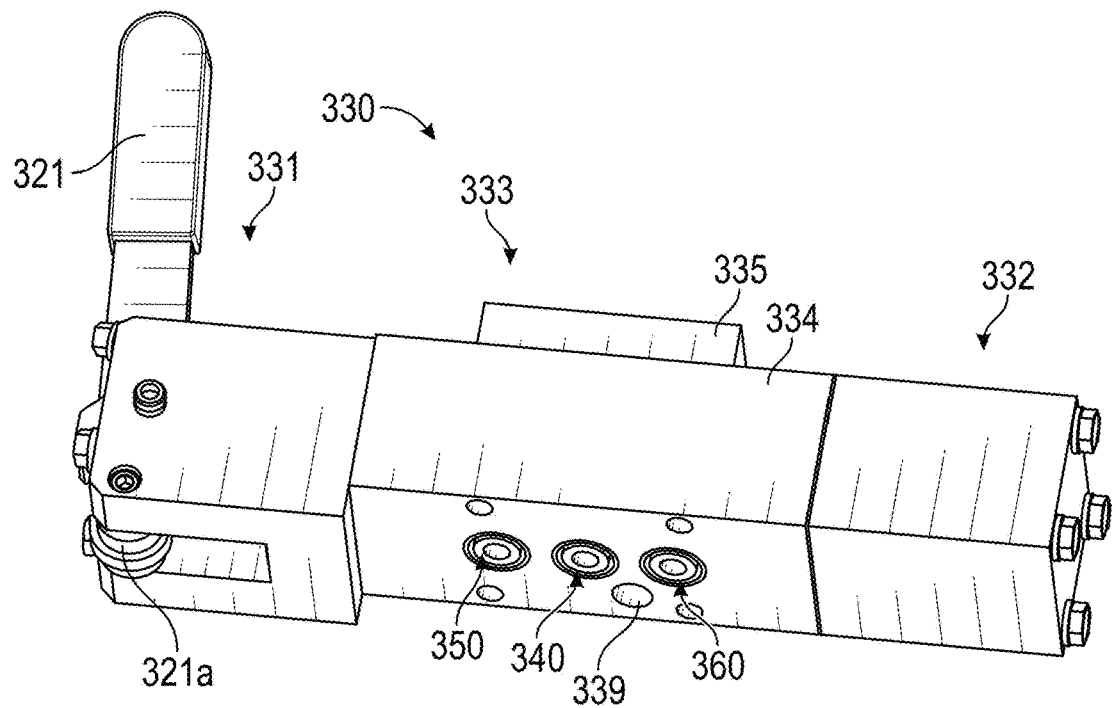
FIG. 3B shows a bottom view of the linear shear flow valve.
Figure 4A:
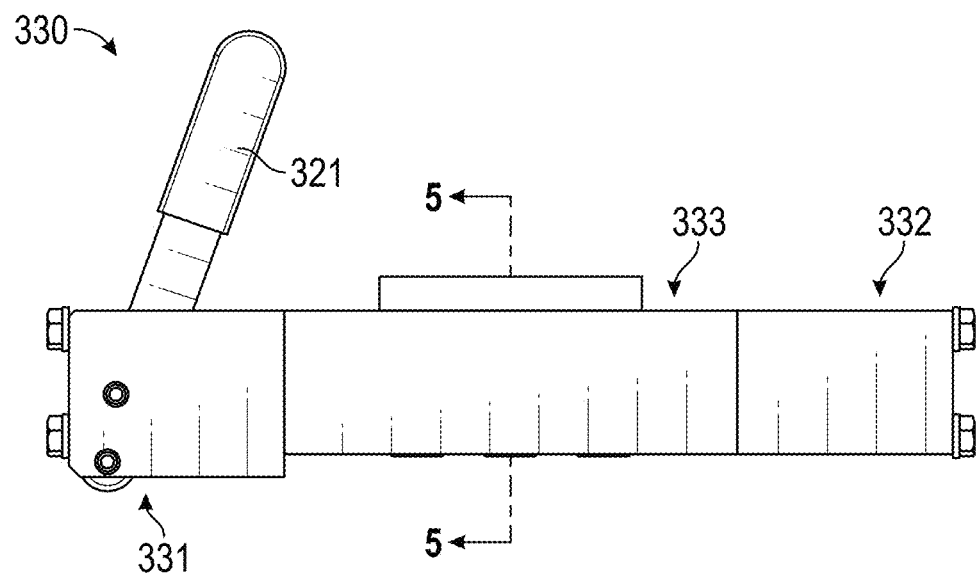
FIG. 4A shows a front view of the linear shear flow valve.
Figure 4B:
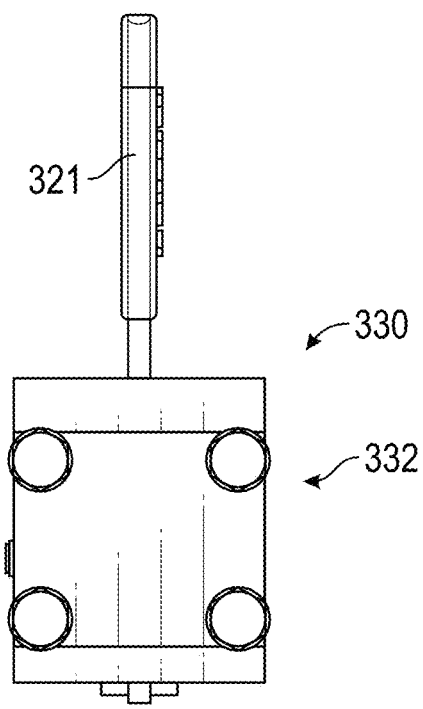
FIG. 4B shows an end view of the linear shear flow valve.

FIG. 3B shows a lower face of the valve section 333. The lower face can be opposite the plate 335. The valve 330 can include a supply port 340. The supply port 340 can receive a supply of hydraulic fluid under pressure. The valve 330 can include a first work port 350. The first work port 350 can function as either a supply or return flow path for the hydraulic supply depending on the configuration of the DCV 330. The valve 330 can include a second work port 360. The second work port 360 can alternatively function as a supply port or return port for the hydraulic supply depending on the configuration of the linear control valve 330. In addition, the housing 334 can include a return port 339. The return port 339 can be in communication with an interior of the outer housing 334. The return port 339 can be located in any of the faces or sides of the outer housing 334. The supply port 340, first work port 350, and second work port 360 can be located in the lower face of the valve section 333.

FIGS. 5-6B shows further detail of the DCV 330. The supply port 340 can include a first seal ring holder 341. The first ring holder 341 can include a generally cylindrical structure with a central aperture extending therethrough. A first end of the ring holder 341 can include a cylindrical portion with an outer surface. The outer surface of the cylindrical portion of the ring holder 341 can include one or more annular grooves. A first annular groove 341a can include an O-ring 347a and/or a backup ring 347b. A second annular groove 341b can include an O-ring 347c to form a radial seal (e.g., with external plate, like plate 335). The first end of the ring holder 341 can further include a lip 341c. The lip 341c can extend around a circumference of the cylindrical portion.

A second end of the ring holder 341 can include a cylindrical portion with an outer surface. The second end of the ring holder 341 can have a smaller diameter than the first end. The second end of the ring holder 341 can include a recess (e.g. circular recess) for receiving the first seal ring 342.

The supply port 340 can include a first ring 342. The first seal ring 342 can be generally cylindrical with an aperture extending therethrough. An outer surface of a first end of the first seal ring 342 can include an annular groove 342a. The annular groove 342A can contain an O-ring 346a and/or a spacer 346b. The first ring 342 can be installed within the recess in the second end of the ring holder 341. The O-ring 346a can provide a seal between the first seal ring 342 and an inner surface of the recess of the second end of the ring holder 341.

The first seal ring 342 can include a lower lip 342b. The lower lip 342b can be annular and extend around the aperture of the fire seal ring 342. The lower lip 342b can include a planar surface for providing a metal-to-metal seal. The planar surface can be a lapped and/or polished surface to affect a metal-to-metal seal.

The supply port 340 can include a wave spring 345. The wave spring 345 can be positioned within the recess of the ring holder 341. The wave spring 345 can be positioned between the first seal ring 342 and an inner ledge within the ring holder 341.

The DCV 330 can include a slider 370. The slider 370 can be located within an interior space 336 of the outer housing 334. The slider 370 can include passage 373. The passage 373 can extend from an upper face 370a to a lower face 370b of the slider 370. The slider 370 can be movable along a linear axis within the interior space. The slider 370 can further include a first aperture 375 into an inner passage 374. The first aperture 375 and the inner passage 374 can be unconnected and separate from the flow path 373. The slider 370 can include a second aperture 378 into an inner passage 377. The second aperture 378 and the inner passage 377 can be unconnected and separate from the flow path 373.

The housing 334 can include a first opening 340a into the interior space 336. The first ring holder 341 can be disposed within the first aperture 340a. The O-rings 347a, 347c can seal against inner walls of the aperture 340a. The first opening 340a can include an inner ledge 340c. The lip 341c can abut the ledge 340c to position the first ring holder 341 within the first opening 340a. Alternatively, an expanding ring can be used to hold the ring holder 341 within the aperture 340a.

The first end of the ring holder 341 can be disposed within the aperture 340a. The second end of the ring holder 341 can at least partially extend from the aperture 340a. The first ring 342 can be disposed within the recess in the first ring holder 341. The lower lip 342b can contact the upper face 370a of a slider 370. The upper surface 370a can include a lapped surface. The lower lip 342b can seal against the upper face 370a in a metal-to-metal seal, even during sliding contact between the first ring 342 and the slider 370. The wave spring 345 can bias the first ring 342 towards the uppers face 370a with a sealing force (e.g., an initial sealing force). As the slider 370 is moved along the linear axis, the first seal ring 342 can be aligned with the passage 373, the first aperture 375 or the second aperture 378, depending on a position thereof, as described further below.

The supply port 340 can further include a second ring holder 343, a second ring 344, along the O-rings, spacers, and wave springs. The second ring holder 343 and the second ring 344 can be structured as the first ring holder 341 and first ring 342. The housing 334 can include a second aperture 340b. The second ring holder 343 can be disposed in the second aperture 340b and the second ring 344 can be installed within the second ring holder 343. The second ring 344 can seal against the lower face 370b of the slider 370. The first and second apertures 340a, 340b can be aligned along a single axis. The components of the supply port 340 can be aligned align the single axis.

Figure 7:
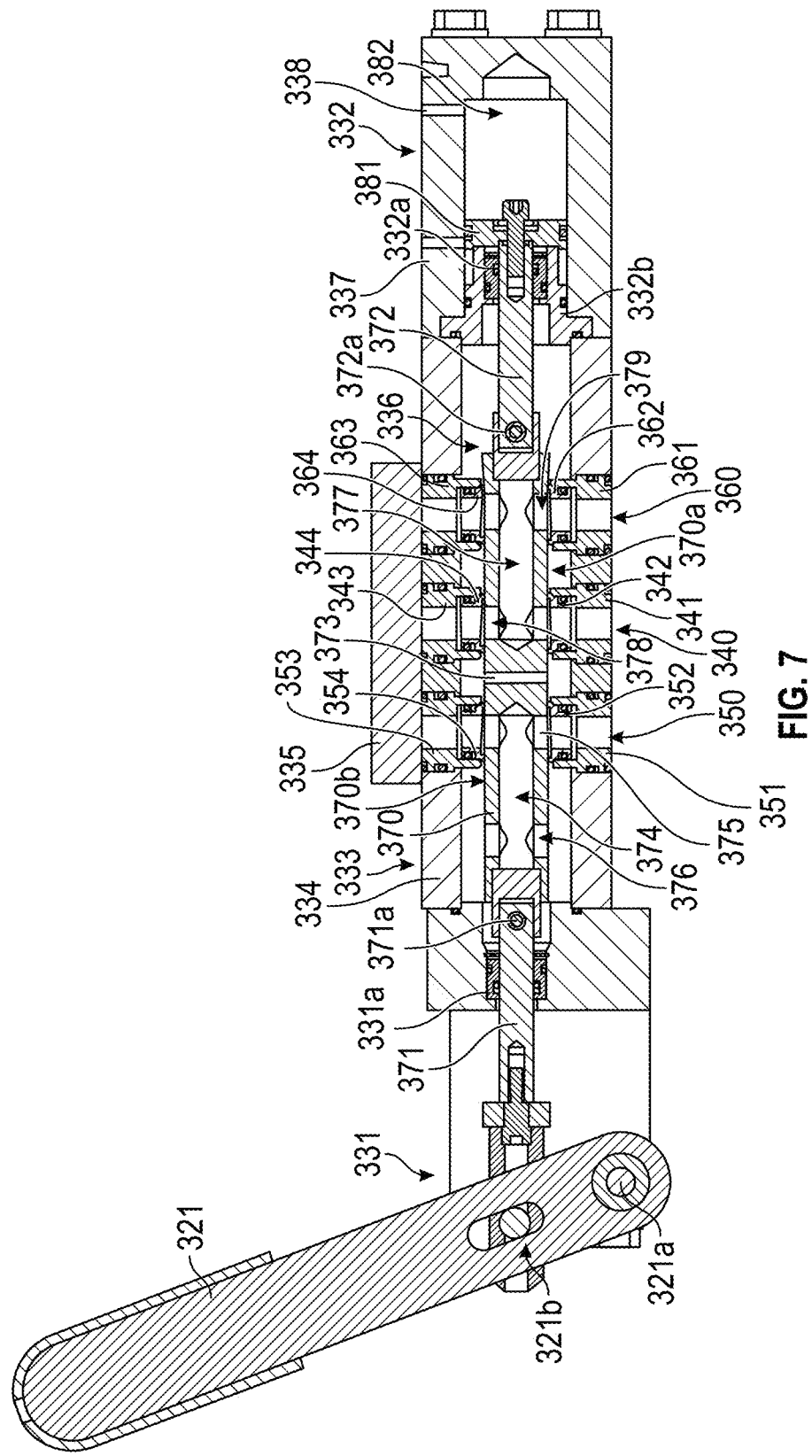
FIG. 7 shows a section view of the linear shear flow valve in a first configuration.

As shown in FIG. 7, the first work port 350 can include a first ring holder 351, a first seal ring 352, a second ring holder 353, a second seal ring 354. The rings and ring holders of the first work port 350 can be structured as the first ring holder 341 and first ring 342. The first ring holder 351 can be located within a first aperture 350a within the outer housing 334. The second ring holder 353 can be located in the second aperture 350b in the outer housing 334.

The first and second apertures 350a, 350b can be structured as the first aperture 340a. The first and second seal rings 352, 354 can be installed within the respective first and second ring holders 351, 353. Sealing surfaces of the first and second seal rings 352, 354 can be in contact with the upper and lower faces 370a, 370b of the slider 370 and provide a metal-to-metal seal therewith.

The second work port 360 can include a first ring holder 361, a first seal ring 362, a second ring holder 363, a second seal ring 364. The rings and ring holders of the second work port 360 can be structured as the first ring holder 341 and first ring 342. The first ring holder 361 can be located within a first aperture 360a within the outer housing 334. The second ring holder 363 can be located in the second aperture 360b in the outer housing 334. The first and second apertures 360a, 360b can be structured as the first aperture 340a. The first and second seal rings 362, 364 can be installed within the respective first and second ring holders 361, 363. Sealing surfaces of the first and second seal rings 362, 364 can be in contact with the upper and lower faces 370a, 370b of the slider 370 and provide a metal-to-metal seal therewith.

The plate 335 can block the second aperture 340b, second aperture 350b, and/or second aperture 360b. The plate 335 can be removable coupled with an upper face of the outer housing 334. A lower face of the outer housing 334 (opposite the upper face) can be configured to couple with a manifold (not shown). The manifold can include passages for communication with the supply port 340, first work port 350, second work port 360, and/or The slider 370 can be located within the interior space 336. The slider can be moveable along a first axis (e.g. left and right, as shown in FIG. 7). The slider 370 can include a first side including the first inner passage 374. The first inner passage 374 can be in communication with the first aperture 375 and a second aperture 376. The first aperture 375 can be in communication with the second aperture 376 through the inner passage 374. The first and second apertures 375, 376 can extend through the upper face 370a and the lower face 370b of the slider 370. The first and second apertures 375, 376 can be spaced apart a distance equal to a spacing between the supply port 340 and the first work port 350.

A second end of the slider 370 can include the second inner passage 377. The second inner passage 377 can be in communication with a third aperture 378 and a fourth aperture 379. The third aperture 378 can be in communication with the fourth aperture 379 through the inner passage 377. The third and fourth apertures 378, 379 can extend through the upper and lower surfaces 370a, 370b of the slider 370. The third and fourth apertures 378, 379 can be spaced apart a distance equal to a spacing between the supply port 340 and the second work port 360.

The first end of the slider 370 can be coupled with a shaft 371. A first end of the shaft 371 can be coupled with the first end of the slider at a pin 371a. The shaft 371 can couple at a second end with the handle 321. The shaft 371 can couple with the handle 321 through a pin and slider connection 321b. The shaft 371 can extend through a guide 331a. The guide 331a can be located in the housing of the first end 331. The guide 331a can include one or more O-rings for hydraulically isolating the interior space 336 between the first end 331 and the valve section 333. The handle 321 can be pivotable about a pivot 321a to move the shaft 371 and the slider 370. Actuation or rotation of the lever 321 about the pivot 321a can move the slider along the linear axis (e.g. in the left and right directions).

The second end of the slider 370 opposite the first end can be coupled with a second shaft 372. A pin 372a can couple the slider 370 with the shaft 372. The shaft 372 can extend into a chamber 382 in the second end 332. The chamber 382 can contain a piston 381. The piston 381 can be coupled with the shaft 372. The shaft 372 can extend through one or more piston guides 332a, 332b. The piston guides 332a, 332b can include one or more O-rings for isolating the interior space 336 from the chamber 382. The slider 370 can be moveable along the linear axis by movement of the piston 381 within the chamber 382. The piston 381 can be moveable within the chamber 382 via a hydraulic supply fluid into one of the pilot holes 337, 338. The slider 370 can be movable either manually (e.g., by handle 321) or using a hydraulic pilot (e.g., pilot holes 337, 338).

FIG. 7 shows the DCV 330 in a first configuration. In the first configuration, the third aperture 378 of the slider 370 is aligned with the supply port 340 and the fourth aperture 379 is aligned with the second work port 360. In this configuration, the DCV 330 forms a first flow path for the hydraulic supply fluid to flow through the supply port 340 and the third aperture 378, into the second interior space 377 and through the fourth aperture 379, and out through the second work port 360. The second work port 360 can be hydraulically coupled with a BOP actuator. Routing the hydraulic supply fluid through the second work port 360 can actuate the BOP actuator in a first direction.

In the first configuration, the first aperture 375 of the slider 370 can be aligned with the first work port 350 and the second aperture 376 can be aligned with the interior space 336. The first work port 350 can be hydraulically coupled with the BOP actuator to receive a hydraulic return fluid. For example, the first work port 350 can be coupled with the same BOP actuator as the second work port 360, but on an opposite side of thereof. In the first configuration the DCV 330 forms also forms a second flow path for the hydraulic return fluid to flow into the first work port 350 and through the first aperture 375, into the first inner space 374, and through the second aperture 376 into the interior space 336. The returning hydraulic fluid can pass through the interior space 336 out the return port 339. The return port 339 can be coupled with a hydraulic fluid tank or vent to the environment. One aspect of the DCV 330 is the internal flow area for the return port 339 can be large in comparison to the supply port 340 which reduces the fluid velocity and thus component wear and hydraulic hammer effects.

Figure 8:
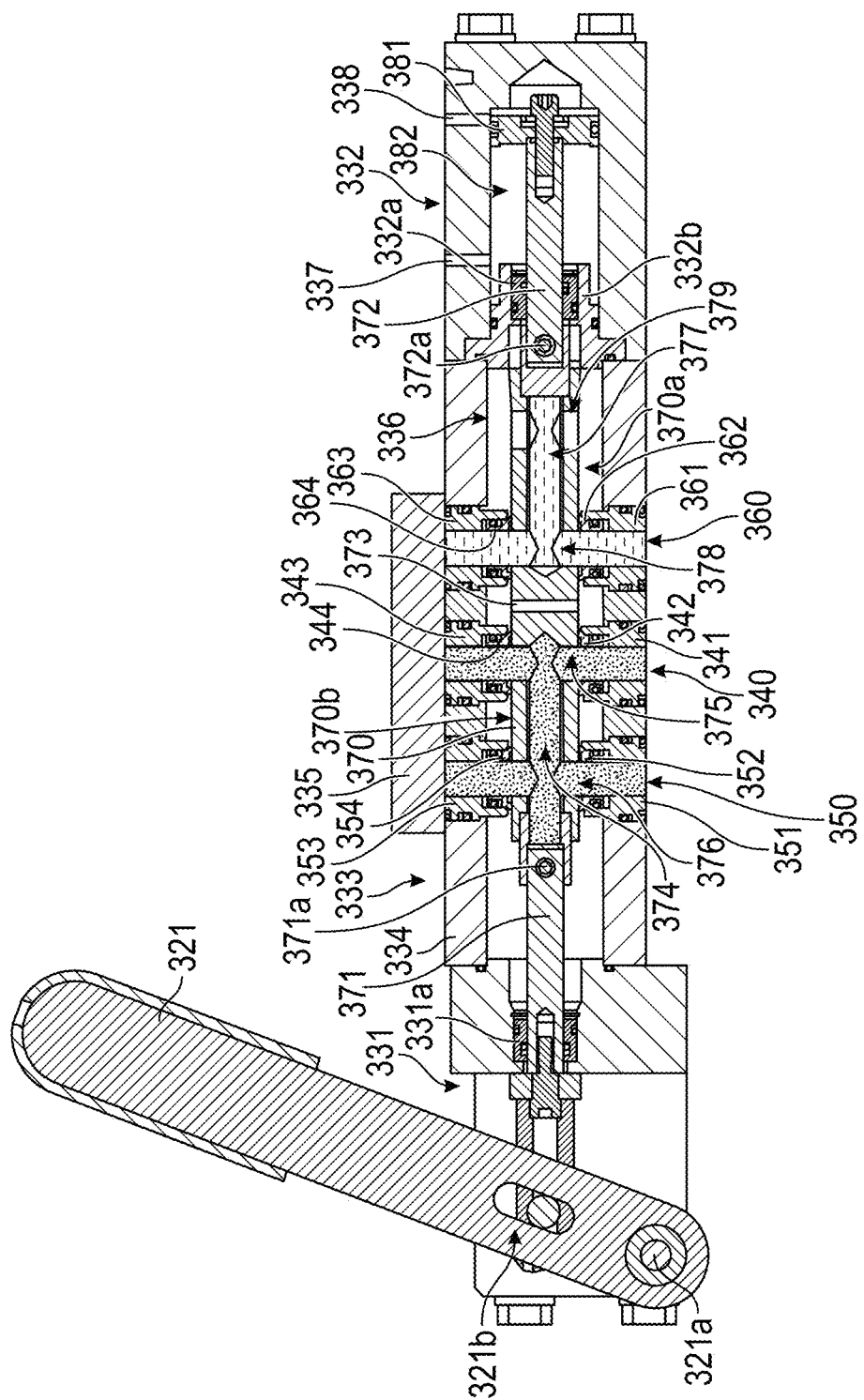
FIG. 8 shows the linear shear flow valve in a second configuration.

FIG. 8 shows the DCV 330 in a second configuration. In the second configuration, the first aperture 375 of the slider 370 is aligned with the supply port 340 and the second aperture 376 is aligned with the first work port 350. In this configuration, the DCV 330 forms a first flow path for the hydraulic supply fluid to flow through the supply port 340 and the first aperture 375, into the second interior space 374 and through the second aperture 376, and out through the first work port 350. The first work port 350 can be hydraulically coupled with the BOP actuator. Routing the hydraulic supply fluid through the first work port 350 can actuate the BOP actuator in a second direction (e.g., opposite the first direction).

In the second configuration, the third aperture 378 of the slider 370 can be aligned with the second work port 360 and the fourth aperture 379 can be aligned with the interior space 336. The second work port 360 can receive a hydraulic return fluid. In the second configuration, the DCV 330 forms also forms a second flow path for the hydraulic return fluid to flow into the second work port 360 and through the third aperture 378, into the second inner space 377, and through the fourth aperture 379 into the interior space 336. The returning hydraulic fluid can pass through the interior space 336 out the return port 339. The return port 339 can be coupled with a hydraulic fluid tank or vent to the environment.

Figure 9:
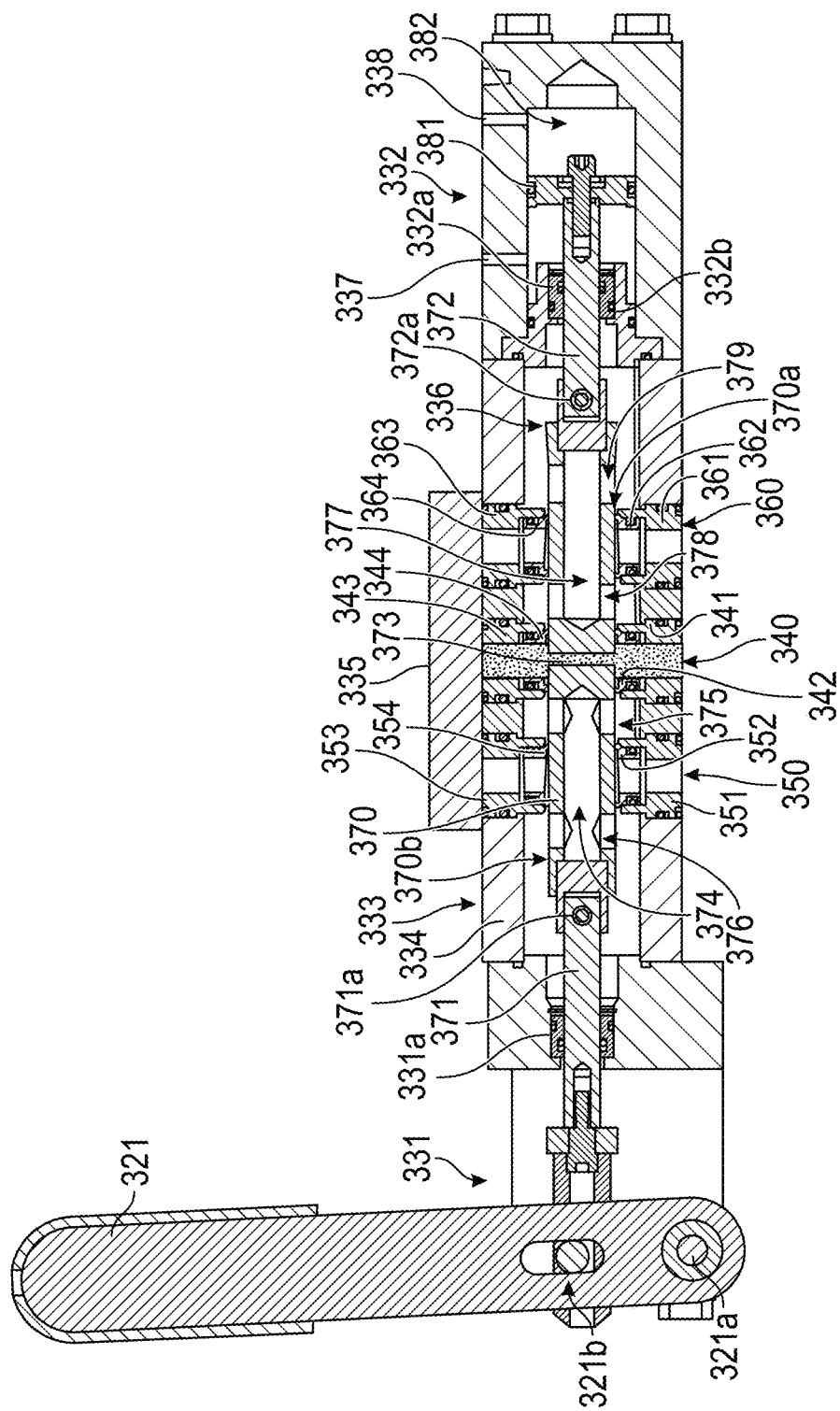
FIG. 9 shows the linear shear flow valve in a blocked configuration.
Figure 10C:
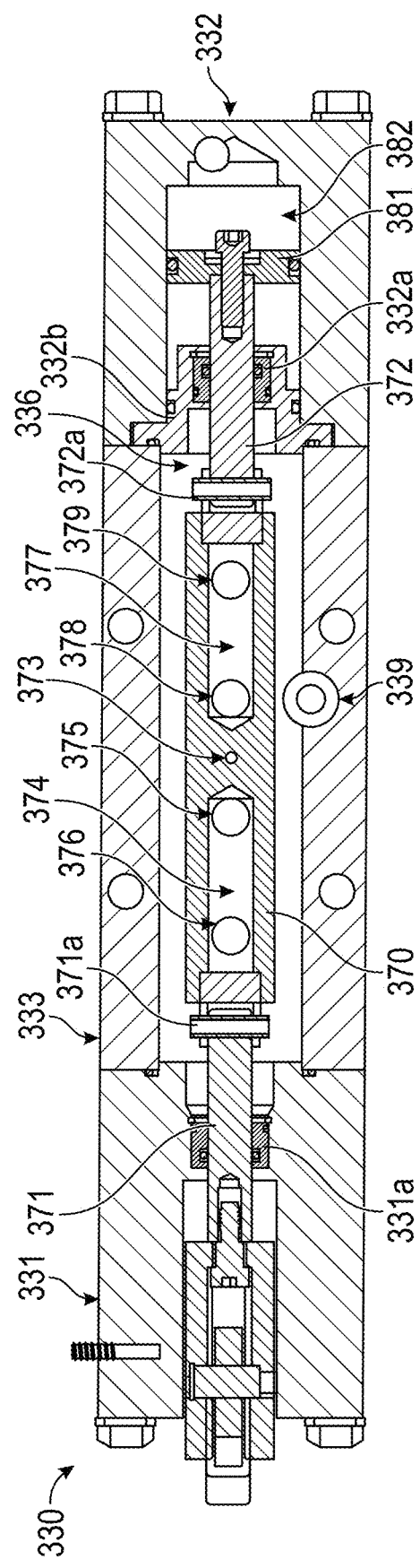
FIG. 10C shows a section view taken along the line 10C-10C in FIG. 10A.
Figure 10D:
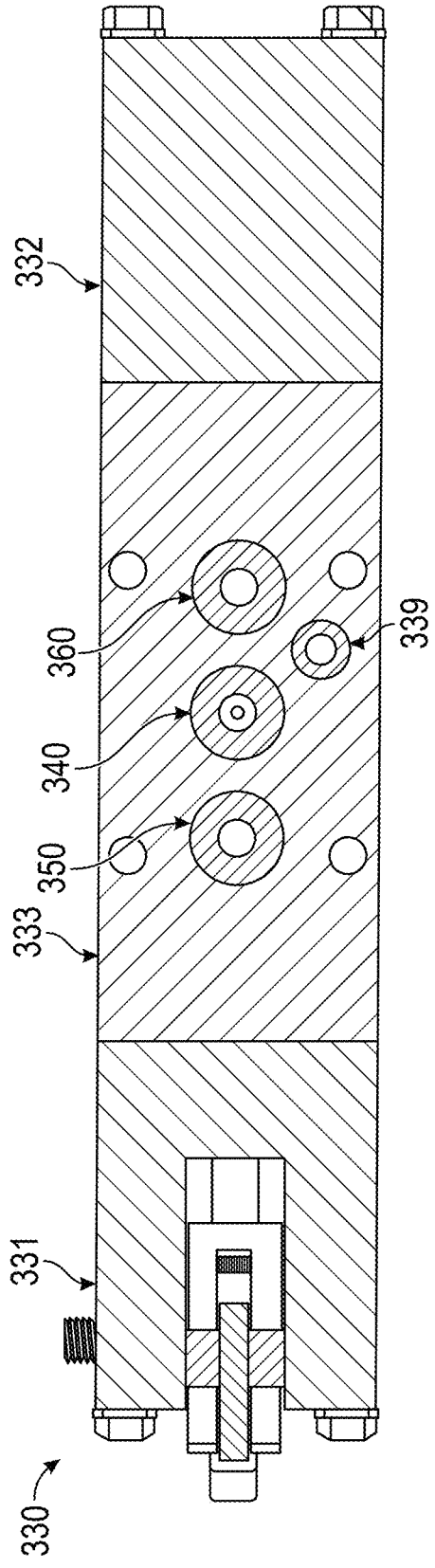
FIG. 10D shows a section view taken along the line 10D-10D in FIG. 10A.

FIG. 9 shows a blocked configuration of the slider 370. In the block configuration the passageway 373 is aligned with the supply port 340. Thus, the hydraulic supply fluid has no path to proceed forward.

One aspect of the DCV 330 is the use of the seal rings at each port in pairs (e.g., first and second seal rings 342/344, 352/354, 362/364). By aligning the pairs of seal rings on opposite sides of the slider 370, the pressure from the hydraulic supply fluid or hydraulic return fluid through the ports is applied on opposite sides of the slider 370. Thus, the pressure from the hydraulic fluid can be equal on the upper and lower faces 370a, 370b of the slider 370. An advantage of this arrangement is that the pairs of seal rings can help maintain the slider 370 centered within the valve section 333. The pairs of seal rings also help maintain the metal-to-metal seals between the seal rings and the upper and lower faces of the slider 370. This advantage also applies to the other valve assemblies described herein below. The hydraulic pressure can increase the sealing force between the seal rings and the slider to maintain the metal-to-metal seal beyond the force provided by the wave springs (e.g., wave spring 345).

Figure 11A:
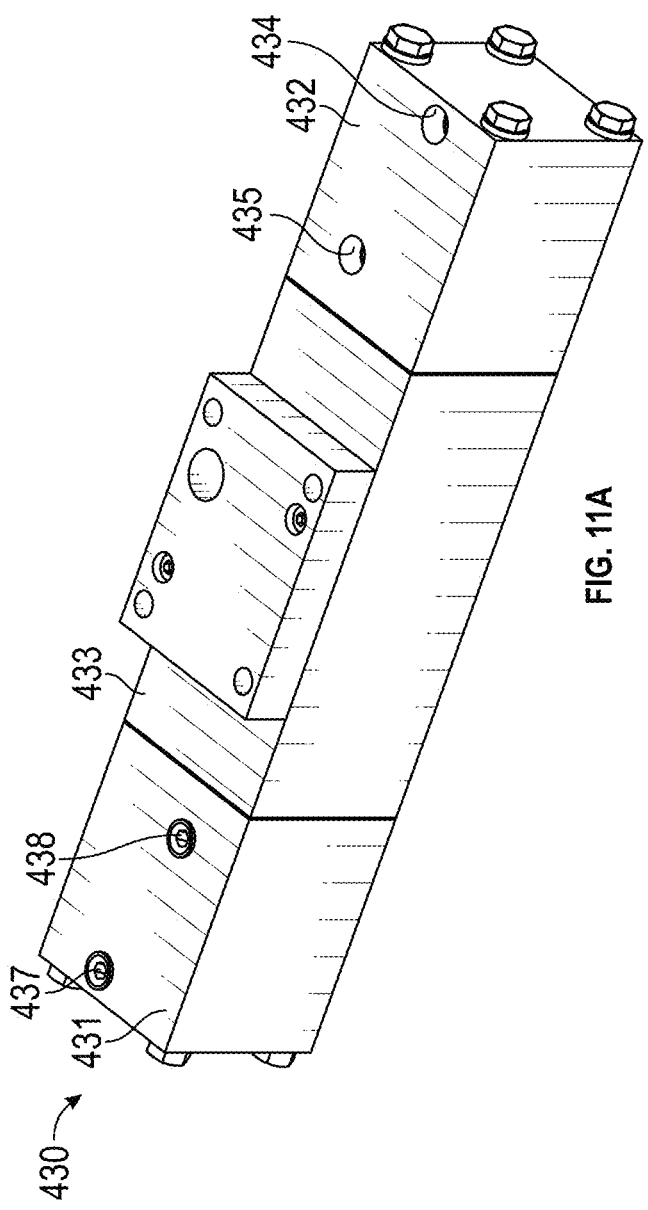
FIG. 11A shows another embodiment of a linear shear flow valve.

FIG. 11A shows another embodiment of a linear shear flow valve 430. The linear shear flow valve 430 can be structured the same as the DCV 330, with the differences noted below. Instead of including a lever handle for manual movement of a slider 470, the linear shear flow valve 430 includes a first end 431 with a first piston 481 coupled with the slider 470 and a second end 432 with a second piston 483 coupled with the second end of the slider 470. The first end 431 can include first and second pilot holes 437, 438 for connecting with a pressure source for moving the first piston 481 within a chamber in the first end 431. Similarly, the second end 432 can include first and second pilot holes 434, 435 for connection with a pressure source for moving the second piston 483 within a chamber.

Additionally the first end 431 can include a first spring 482. The first spring 482 can be coupled with the piston 481 or otherwise with a shaft 471 connecting the slider 470 with the piston 481. The spring 482 can bias the slider 470 into any of the first configuration, second configuration or blocked configurations depending on the nature of the spring.

Figure 11B:
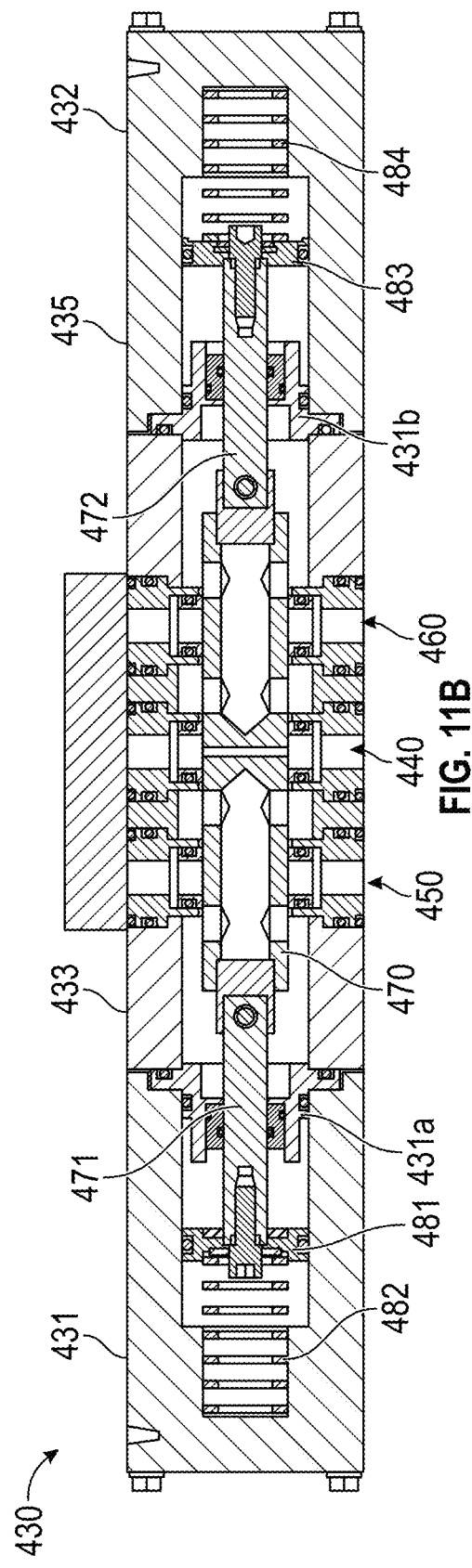
FIG. 11B shows a section view of the linear shear flow valve of FIG. 11A.
Figure 12A:
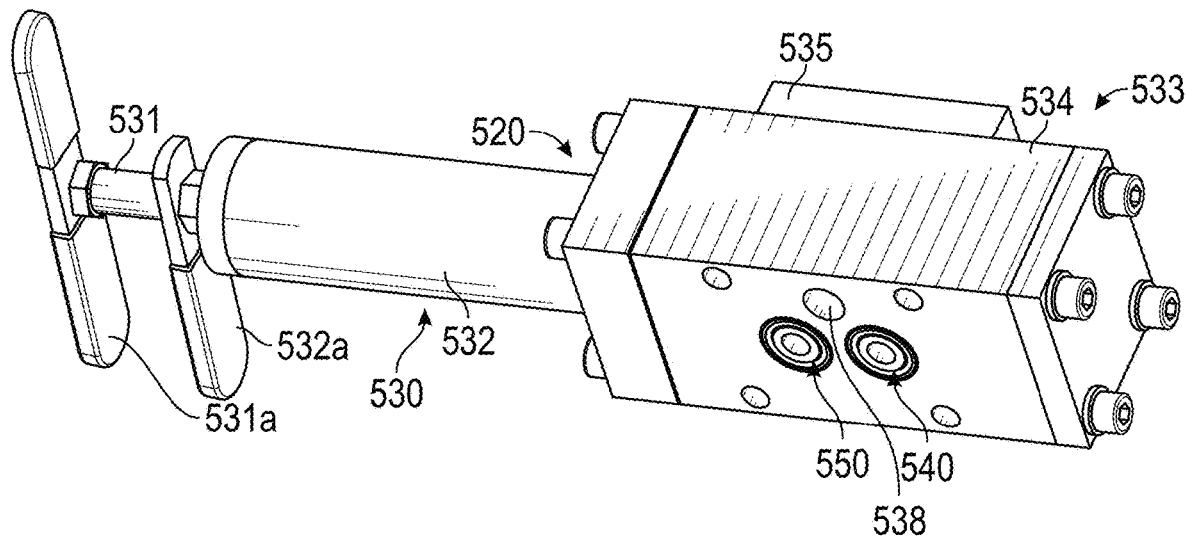
FIG. 12A shows a perspective view of a pressure reducing and regulating valve.
Figure 12B:
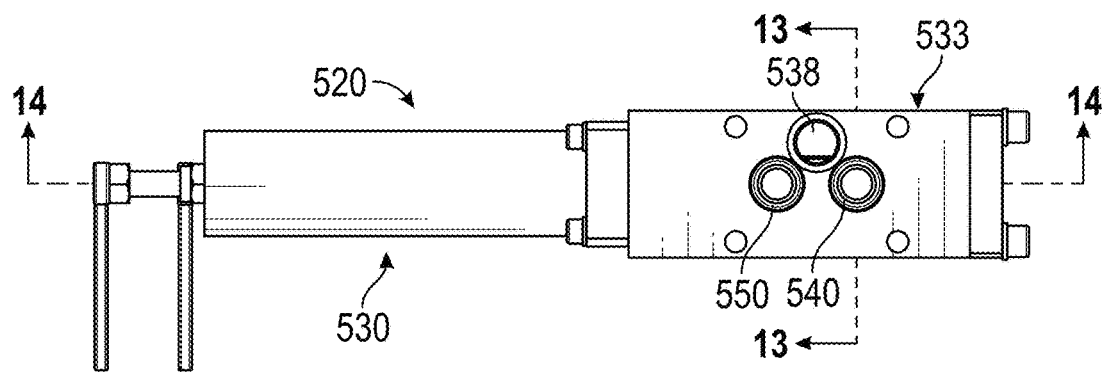
FIG. 12B shows a side view of the pressure reducing and regulating valve of FIG. 12A.
Figure 13:
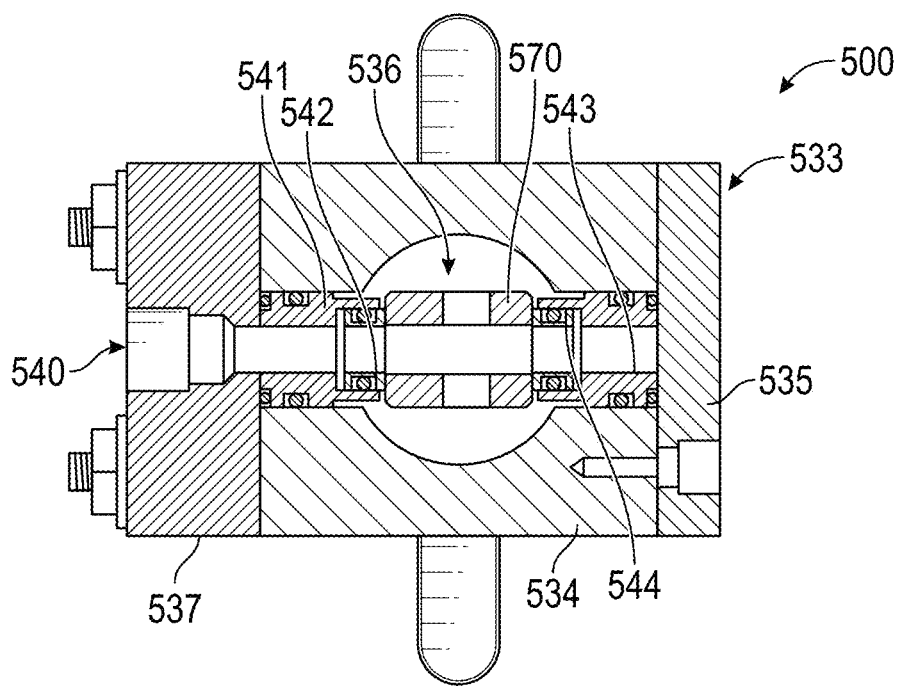
FIG. 13 shows a section view taken along the line 13-13 in FIG. 12B.

The second slider end 432 can similarly include a second spring 484. The second spring 484 can be coupled with the second end of the slider 470 through a shaft 472 and/or the piston 483 for biasing the position of the slider 470 into any of the first, second or blocked configurations, depending on the configuration of the second spring 484. As shown in FIG. 11B, the first and second springs 482, 484 bias the slider 470 into the blocked configuration.

The linear shear flow valve 430 can include a valve section 433 including a supply 440, a first work port 450 and a second work port 460 similar to the work ports 340, 350, 360 described above. One or more piston guides 431a can separate and seal the chamber of the first piston 481 from an interior space of the valve section 433. A second piston guide 431b can separate and seal the chamber of the second piston 483 from the interior of the valve section 433. In other implementations, the pistons 481, 483 do not need to be double acting and could include only a single pilot hole for actuation thereof.

FIGS. 12-14C show an embodiment of a pressure reducing and regulating (PRR) valve 520. The PRR 520 can be an embodiment of the pressure valve 120 in the BOP assembly 100. The PRR 520 can function to receive a hydraulic supply fluid at a supply port 540 and output the hydraulic supply fluid at a regulated pressure (within specified range or specified set pressure) at an outlet port 538. The PRR 520 can further include a vent port 550 to accommodate over-pressure received within the housing 534.

The PRR 520 can include a pressure set section 530 and a valve section 533. The valve section 533 can include the housing 534 around an interior space 536. The housing 534 can include one or more planar faces. A first end of the housing 534 can be coupled with the pressure set section 530 (e.g., by mechanical fasteners). A piston guide 534a can include seals to hydraulically seal the interior space 536 at the first end. A second end of the housing 534 can include a cap member 534b. The cap member 534b can be coupled with the second end mechanical fasteners. An upper face of the housing 534 can include a plate 535. The plate 535 can seal one end of the supply port 540 and/or the vent port 550. The plate 535 can be coupled with the upper face of the housing 534 by mechanical fasteners. The plate 537 can seal an opposite end of the housing 534 and include conduits coupling to the supply port 540 and/or the vent port 550. The outlet port 538 can comprise an aperture through the housing 534 with communication into the interior space 536. The outlet port 538 can be located within a lower face of the housing 534, opposite the upper face (or any other portion of the housing 534).

Figure 14C:
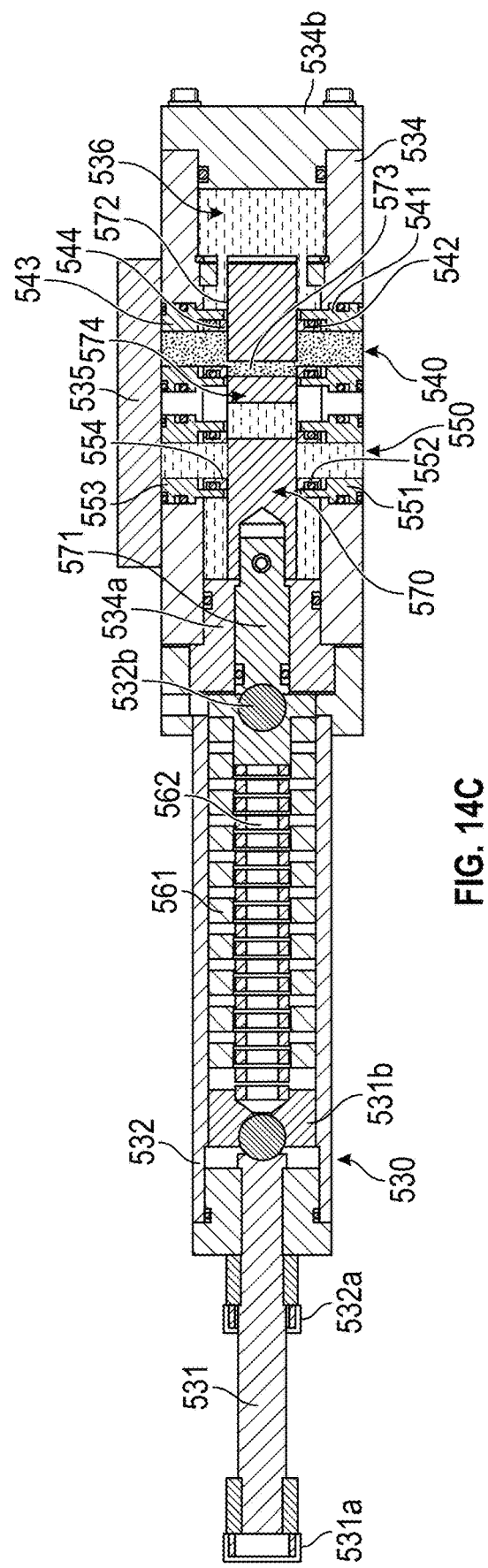
FIG. 14C shows a cross-section of the pressure reducing and regulating valve in a venting configuration.

A slider 570 can be located within the interior space 536. The slider 570 can be moveable along a first axis (e.g. left and right, as shown in FIGS. 14A-C). The slider 570 can include a first end coupled with a shaft 571. The shaft 571 can extend through the piston guide 534a. The shaft 571 can engage with the pressure set section 530, as described further below. A second end of the slider 572 can include a planar surface. The second end 572 can abut the end cap 534b or another portion of the housing 534.

The slider 570 can include a first aperture 574. The first aperture 574 can extend through an upper face 570a and a lower face 570b of the slider 570. The first aperture 574 can be in communication with an inner passage 574a. The inner passage 574a can be in communication with the interior space 536.

The slider 570 can include a blocked aperture 573. The blocked aperture 573 can extend through the upper face 570a and the lower face 570b of the slider 570. The blocked aperture 573 is not in communication with the interior space 536.

The supply port 540 can include a first ring holder 541, a first seal ring 542, a second ring holder 543, a second seal ring 544. The rings and ring holders of supply port 540 can be structured as the first ring holder 341 and first ring 342. The first ring holder 541 can be located within a first aperture within the lower face of the housing 534. The second ring holder 543 can be located in a second aperture within the upper face of the housing 534. The first and second apertures can be structured as the first aperture 340a. The first and second seal rings 542, 544 can be installed within the respective first and second ring holders 541, 543. Sealing surfaces of the first and second seal rings 542, 544 can be in contact with the upper and lower faces 570a, 570b of the slider 570 and provide a metal-to-metal seal therewith.

The vent port 550 can include a first ring holder 551, a first seal ring 552, a second ring holder 553, a second seal ring 554. The rings and ring holders of supply port 550 can be structured as the first ring holder 341 and first ring 342. The first ring holder 551 can be located within a first aperture within the lower face of the housing 534. The second ring holder 553 can be located in a second aperture within the upper face of the housing 534. The first and second apertures can be structured as the first aperture 340a. The first and second seal rings 552, 554 can be installed within the respective first and second ring holders 551, 553. Sealing surfaces of the first and second seal rings 552, 554 can be in contact with the upper and lower faces 570a, 570b of the slider 570 and provide a metal-to-metal seal therewith.

The pressure set section 530 can be coupled with the first end of the housing 534. The pressure set section 530 can include a cylinder member 532 and shaft or screw handle 531. The shaft 531 can be threaded. A first end of the shaft 531 can include an adjustment handle 531a. A second end of the shaft 531 can include a piston member 531b. The piston member 531b can be located within the cylinder member 532. The threaded portion of the shaft 531 can be engaged with a corresponding threaded member 532a in the cylinder 532. Rotation of the shaft 531 can adjust the position of the piston member 531b within the cylinder 532. The cylinder 532 can include a handle to aid a user in the rotation of the shaft 531.

The cylinder member 532 can include a first spring 561. A first end of the first spring 561 can be engaged with the piston member 531b. A second end of the first spring 561 can be engaged with a base 532b of the cylinder member 532. The cylinder member 532 can include a second spring 562. A first end of the second spring 562 can be engaged with the piston member 531b. A second end of the second spring 562 can be engaged with the base 532b. The second spring 562 can be located within the first spring 561 (e.g., coaxially). Adjustment of the position of the piston member 531b within the cylinder 532 can adjust the compression of the first spring 561. The base 532b can be movable and engaged with the shaft 571. Compression of the springs 561, 562 can be based on the position of the slider 570 and the position of the shaft 531 and piston member 531b. The springs 561, 562 can exert a set force on the slider 570 (through the shaft 571). The set force can be adjustable based on the position of the shaft 531. The force can correspond to a set output pressure of the PRR 520, as described further below. Accordingly, the set output pressure of the PRR 520 can be adjustable.

The slider 570 can be movable between a blocked configuration, an open configuration and a venting configuration. The position of the slider 570 can depend on the interaction of a pressure within the interior space 536 and the set force exerted by the springs 561, 562. In the blocked configuration, as shown in FIG. 14A, the slider 570 is positioned so that the blocked aperture 573 is aligned with the supply port 540. The hydraulic supply fluid received at the supply port 540 does not proceed through the PRR 520 with the slider in the blocked configuration. In the blocked configuration, the force exerted on the slider 570 within the interior space 536 by the pressure of the hydraulic supply fluid contained therein is equal to the set force of the springs 561, 562. In this position, the pressure within the interior space 536 corresponds to the set output pressure for the output port 538.

In the open configuration, as shown in FIG. 14B, the slider 570 is positioned so that the first aperture 574 is aligned (e.g., at least partially) with the supply port 540. In the open configuration, the second end of the slider 570 may abut the cap member 534b, or another portion of the housing 534. The alignment of the supply port 540 with the first aperture 574 allows the pressure of the hydraulic supply fluid to pass into the interior space 336 through the inner passage 574a. From the interior space 536, the hydraulic supply fluid can proceed through the output port 538. In the open configuration, the vent port 540 can be completely blocked by the slider 570. In the open configuration, the force exerted on the slider 570 within the interior space 536 by the pressure of the hydraulic supply fluid contained therein is less than the set force of the second spring 562. In this position, the pressure within the interior space 536 is less than the set output pressure for the output port 538. Accordingly, more of the hydraulic supply fluid is allowed to pass through the interior space 536. One aspect of the PRR 520 is the internal flow area through the interior space 536 can be large in comparison to the supply port 540 which reduces the fluid velocity and thus component wear and hydraulic hammer effects.

In the venting configuration, as shown in FIG. 14C, the slider 570 is positioned so that the first aperture 574 is aligned (e.g., at least partially) with the vent port 550. This allows the pressure of the hydraulic supply fluid within the interior space 336 to vent through the vent port 339. In the venting configuration, the force exerted on the slider 570 within the interior space 536 by the pressure of the hydraulic supply fluid contained therein is greater than the set force of the springs 561, 562. In this position, the pressure within the interior space 536 is greater than the set output pressure for the output port 538. Accordingly, some of the hydraulic supply fluid is allowed to pass through the vent port 550. The vent port 550 can be coupled with a hydraulic fluid tank or vent to the environment.

In an alternative embodiment, the set force on the slider 570 can be provided by a hydraulic or air motor, gear driven actuator, air diaphragm, or direct hydraulic pilot. Accordingly, the set force and the corresponding set output pressure can be adjustable either manually at the PRR 520 or via a remotely controlled system.

Figure 15A:
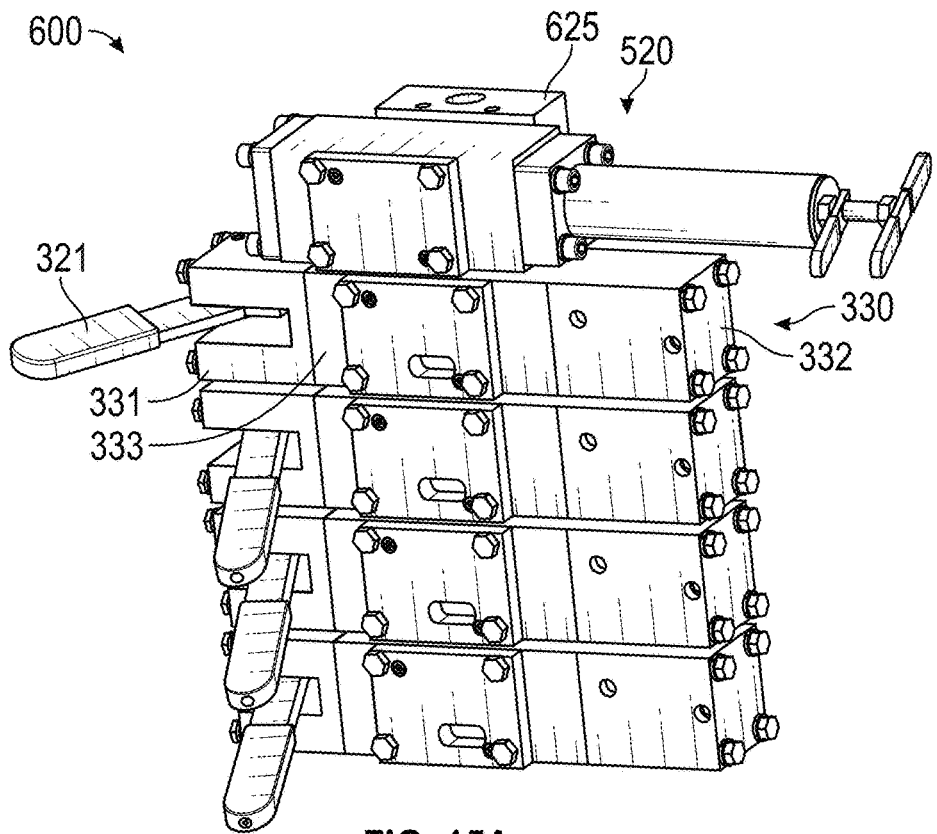
FIG. 15A shows a modular assembly of the pressure reducing and regulating valve and a plurality of linear shear flow valves on a common manifold.
Figure 15B:
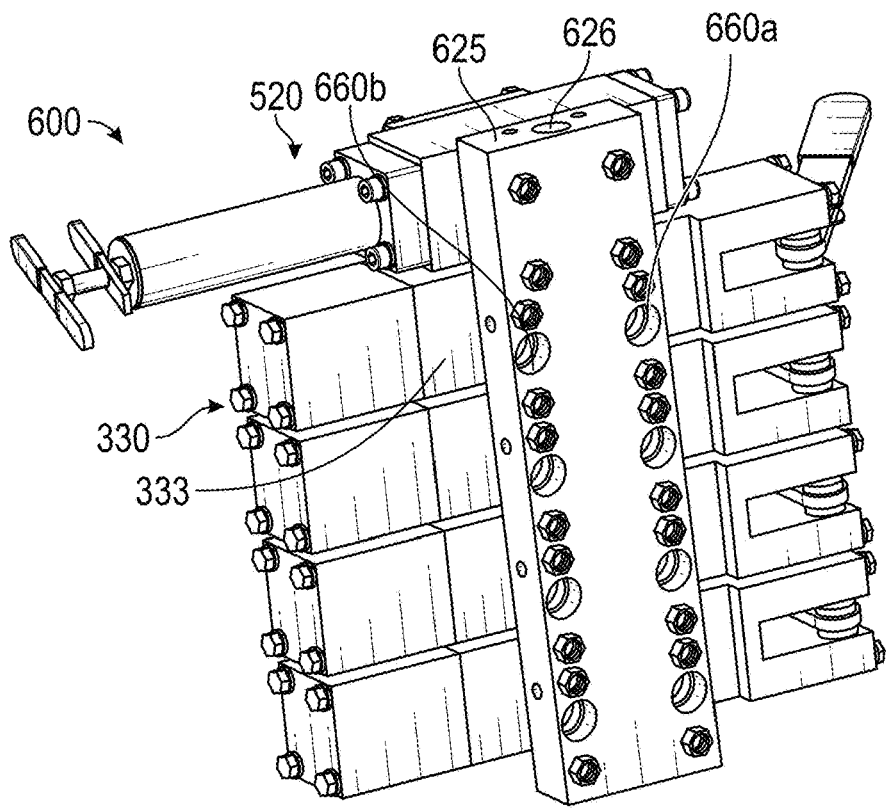
FIG. 15B shows a rear view of the modular assembly of FIG. 15A.
Figure 16C:
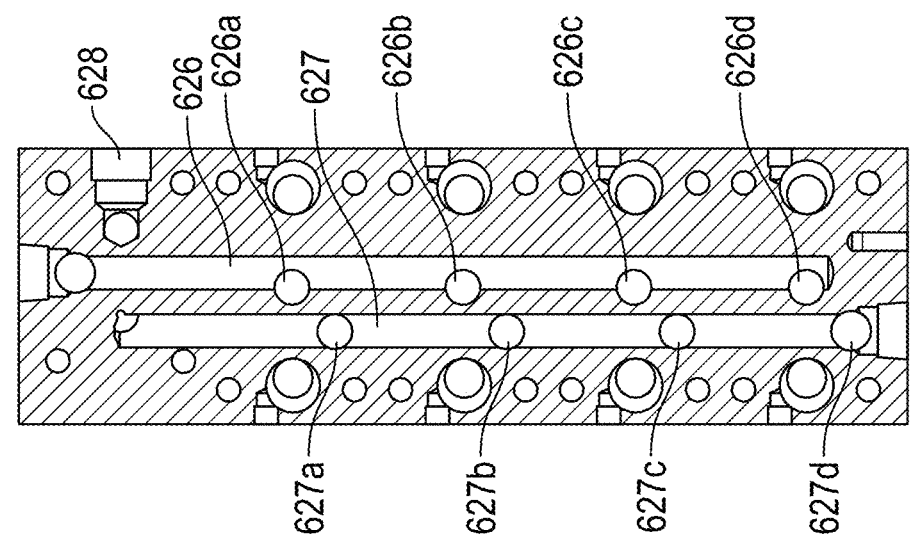
FIG. 16C shows a section view of the common manifold taken on the line 16C-16C in FIG. 16B.
Figure 16B:
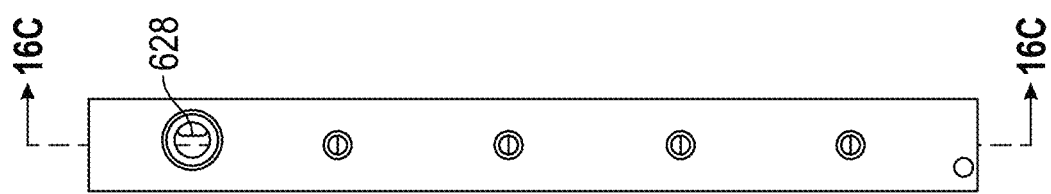
FIG. 16B shows a side view of the common manifold.
Figure 16A:
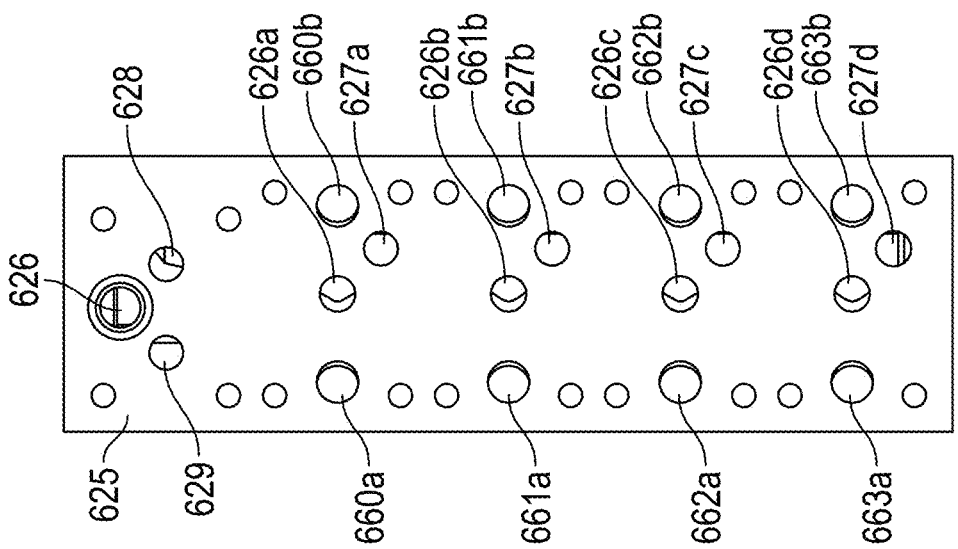
FIG. 16A shows a front view of the common manifold.

FIGS. 15A-B show a manifold assembly 600 including several embodiments of the DCV 330 and the PRR 520 mounted on a common manifold 625. The manifold 625 can be an embodiment of the manifold 125 in the BOP assembly 100. The lower face of the housing 534 (e.g., opposite the plate 535) of the PRR 520 can be mounted on a first face of the manifold 625. The PRR 520 can be coupled using mechanical fasteners. The lower face of the housing 334 (e.g., opposite the plate 335) of the DCV 330 can be mounted on the first face of the manifold 625.

The manifold 625 can include a main hydraulic supply input conduit 628. The main hydraulic supply conduit 628 can be in communication with the supply port 540 of the PRR. The manifold 625 can include a output hydraulic supply conduit 626. The output hydraulic supply conduit 626 can be in communication with the output port 538 of the PRR 520. The output hydraulic supply conduit 626 can further be in communication with the supply ports 340 of the DCV 330s mounted on the manifold 625 for providing the hydraulic supply fluid thereto. The manifold 625 can include apertures 626a-d on a side that connects with the output hydraulic supply conduit 626 and aligns with the supply ports 340 of the DCV 330s. The manifold 625 can include a hydraulic return conduit 627. The hydraulic return conduit 627 can be in communication with return port 339 of the DCV 330s mounted on the manifold 625. The manifold 625 can include apertures 627a-d on one side that connects with the hydraulic return conduit 627 and aligns with the return ports 339 of the DCV 330s. The manifold 625 can include first and second work ports 660a-663a, 660b-663b for each of work conduits 650, 660 of the DCV 330s mounted on the manifold 625.

The DCV 330 and the PRR 520 can be coupled with the manifold 625 using mechanical fasteners. The DCV 330 components can be aligned with the first ends 331 on one side of the manifold 625 and the second ends 332 on the other. The handle 321 can be aligned in a compact arrangement. Adjacent faces of the DCV 330 components can be aligned in a compact arrangement.

Coupling the DCV 330 or the PRR 520 with the manifold 625 can include aligning the ports with the respective conduits. Conduits for coupling with the various, work ports, supply ports, vent ports and return ports of the DCV or PRR can couple with the manifold 625. The DCV or PRR can be removably coupled with the manifold 625. Accordingly, any of the DCV 330 and PRR 520 components can be easily replaced without re-plumbing the conduits of the manifold 625. In certain embodiments, the DCV 330/PRR 520 can be directly mountable to a manifold 625 without additional modification or adapter plates Accordingly, one aspect of the present disclosure is that the several DCV 330 and PRR 520 can be mounted in a compact, modular manner with the manifold 625. According to another aspect, the manifold assemblies 600 allows for a more compact spacing and smaller manifold assembly for the same pressure and flow rate as previous manifold designs. In certain embodiments, the DCV 330 and the PRR 520 can include common parts, such as the rings and ring holders. This, as well as the modular component design allows ease of field modification, repair and maintenance.

Figure 17A:
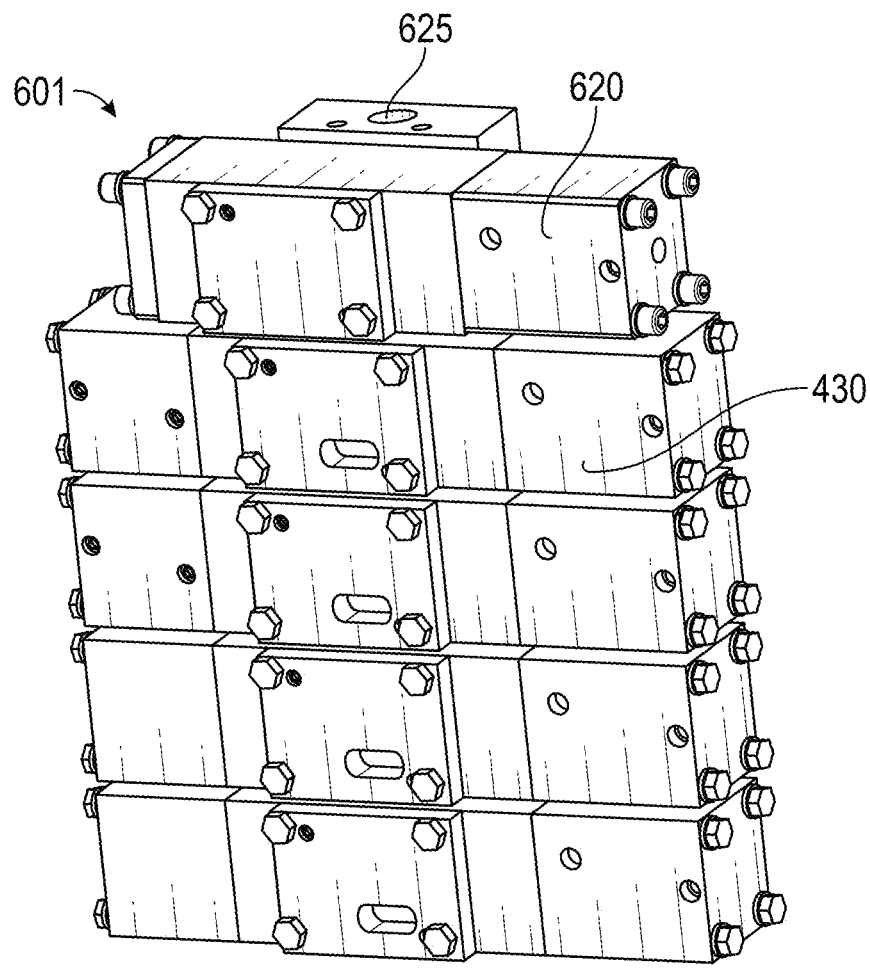
FIG. 17A shows another embodiment of a modular assembly including a pressure reducing and regulating valve and a plurality of linear shear flow valves mounted on a common manifold.

FIG. 17A shows an alternative manifold assembly 601 including several embodiments of the DCV 430 and an alternative PRR 620 mounted on the common manifold 625. The PRR 620 can include a direct hydraulic pilot in place of the shaft 531 and cylinder 532 for adjusting the set output pressure with a spring.

Figure 17B:
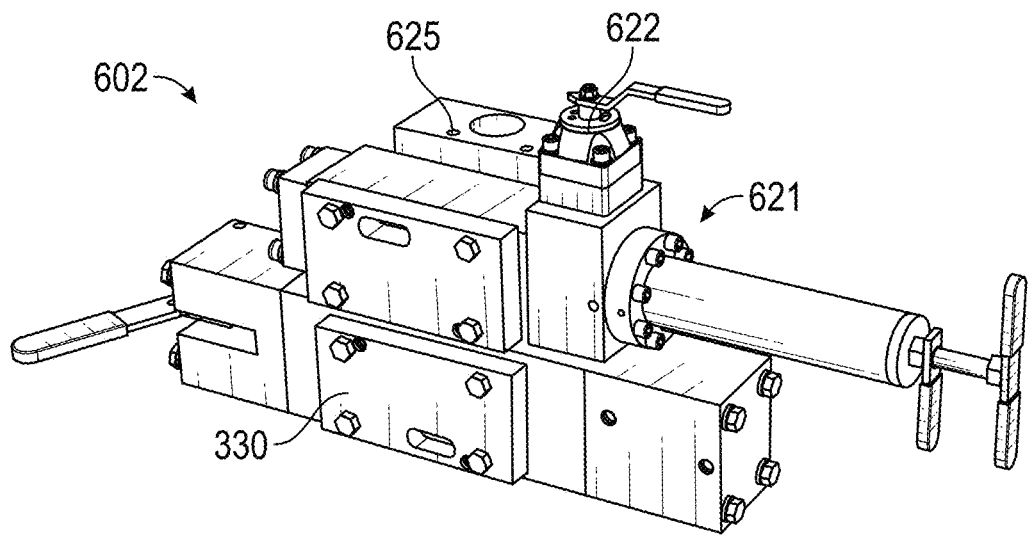
FIG. 17B shows another embodiment of a modular assembly including a pressure reducing and regulating valve having a manual override.

FIG. 17B shows an alternative manifold assembly 602 including the DCV 330 and an alternative PRR 621 mounted on the common manifold 625. The PRR 621 can include the same structure as the PRR 520 with the addition of a manually adjustable valve 622 mounted on the pressure set section 530. The valve 622 can turn on or off a hydraulic override pressure that acts as an override to the set force provided by the springs 561, 562. The hydraulic override pressure can raise the set pressure of the PRR 621 and moves the slider 370 accordingly between the open, blocked, and venting configurations. In certain embodiments, the hydraulic override pressure allows for full hydraulic supply pressure to be supplied to the manifold 625 from the output port 538.

FIGS. 18A-21C show a manifold assembly 700. The manifold assembly 700 can be designed for use in subsea BOP stack installations. The manifold assembly 700 can be installed on the BOP stack attached with the drill string at the well bore. The manifold assembly 700 can include manifold 825, a plurality of cartridge sub-plate mount valves (SPV) 830, and/or a PRR 920 mounted on the manifold 825.

The manifold 825 can include a housing 822. The housing 822 can be generally block-shaped. The housing 822 can include one or more planar faces. An upper surface 822a can include a plurality of valve cavities corresponding to the plurality of SPVs 830. One end of each of the SPVs 830 can be received within a respective valve cavity. The SPVs 830 can be attached with the upper surface 822a through fasteners 830b, such as bolts, installed within respective flanges 830a. The housing 822 can also include a pilot hole 891 corresponding to each of the SPVs 830. A pressure signal can be used to actuate each of the SPVs 830 through the pilot holes 891.

The PRR 920 can include a housing 922. The housing 922 can be generally block-shaped. The housing 922 can include one or more planar faces. An upper surface 925a include a plate 935. The housing 922 can also include a pilot hole 991. The pilot hole 991 can be in the plate 935. A pressure signal can be used to set an output pressure from the PRR 920, as described further below. The housing 922 can further include apertures for a supply port 940, a venting port 950, and/or a return passage 927. The apertures can be positioned in a single face 922a of the housing 922. Accordingly, conduits connecting with the ports 940, 950, 927 at the apertures can be easily assembled with the PRR 920. The housing 922 is further shown in FIGS. 21A-B.

Figure 18A:
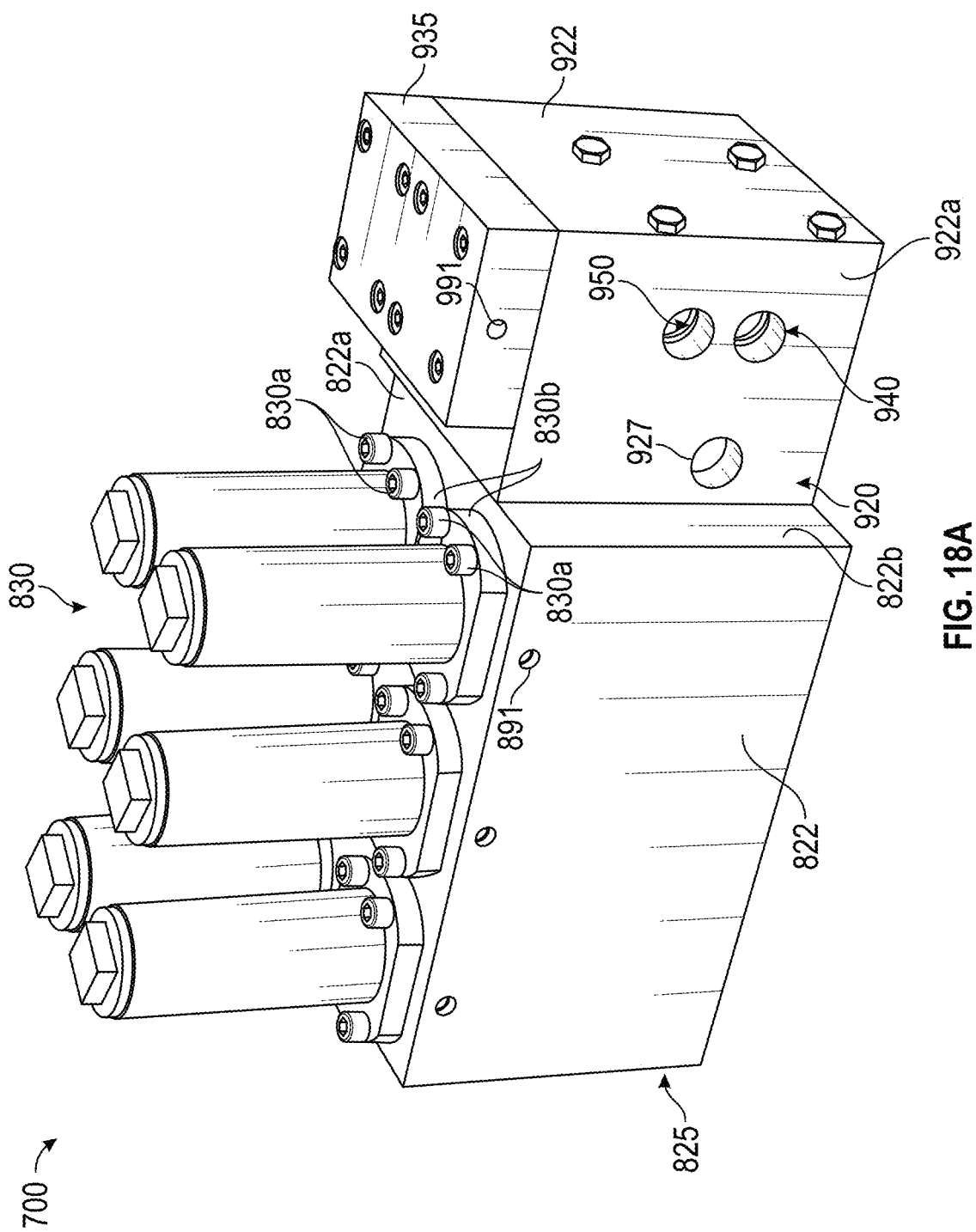
FIG. 18A shows a manifold assembly including a subplate mounted valve and a pressure reducing and regulating valve.
Figure 18B:
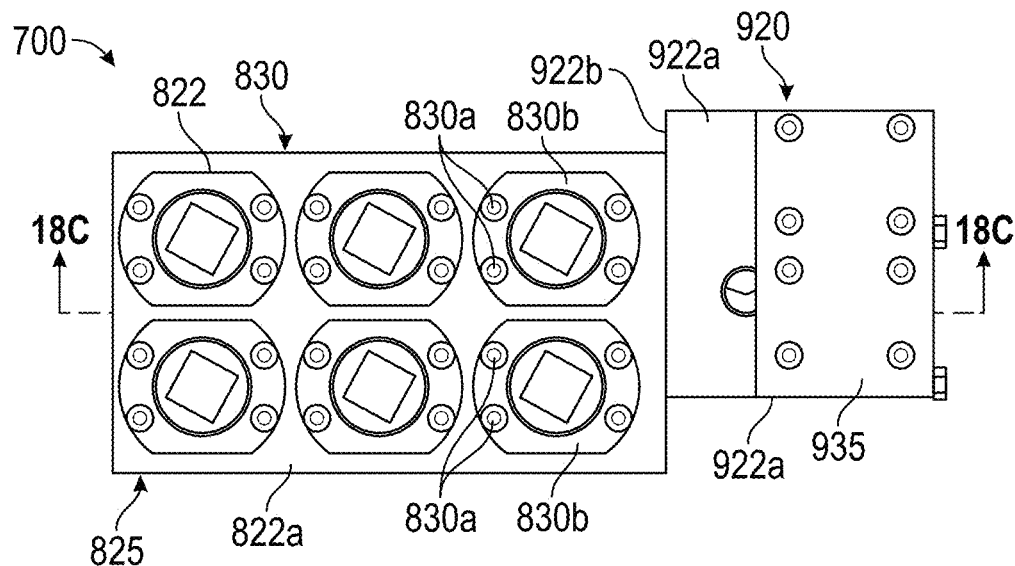
FIG. 18B shows a top view of the manifold assembly.
Figure 18C:
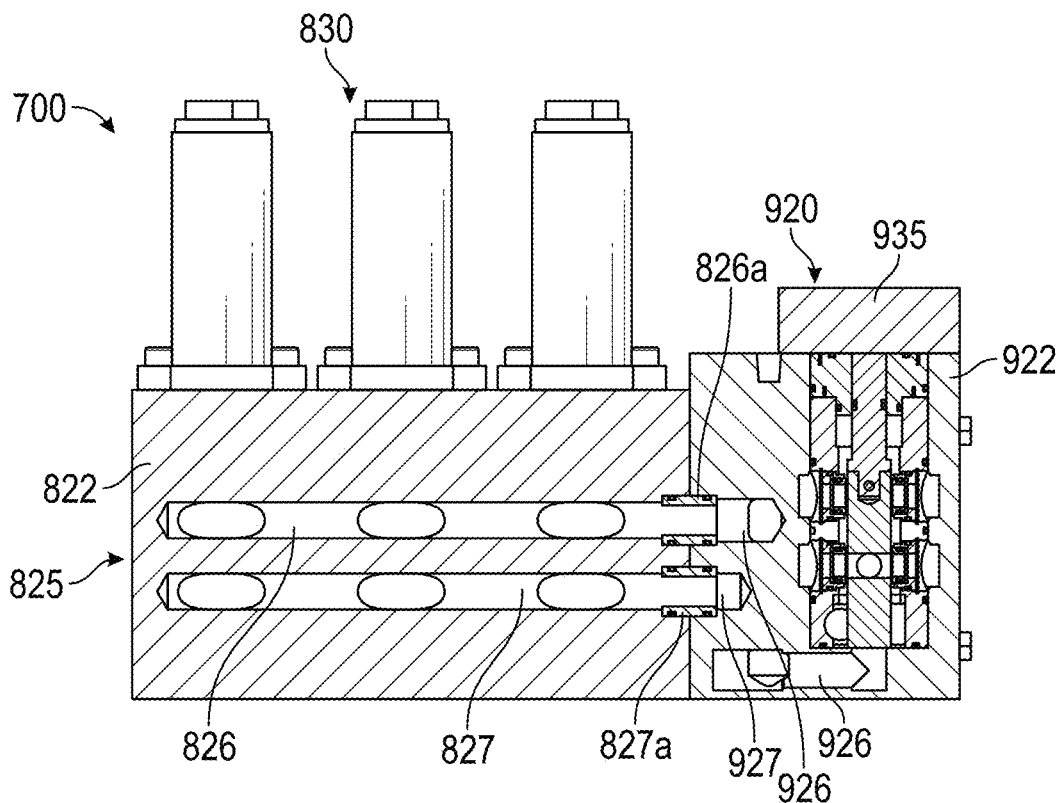
FIG. 18C shows a section taken along the line 18C-18C in FIG. 18B.
Figure 19A:
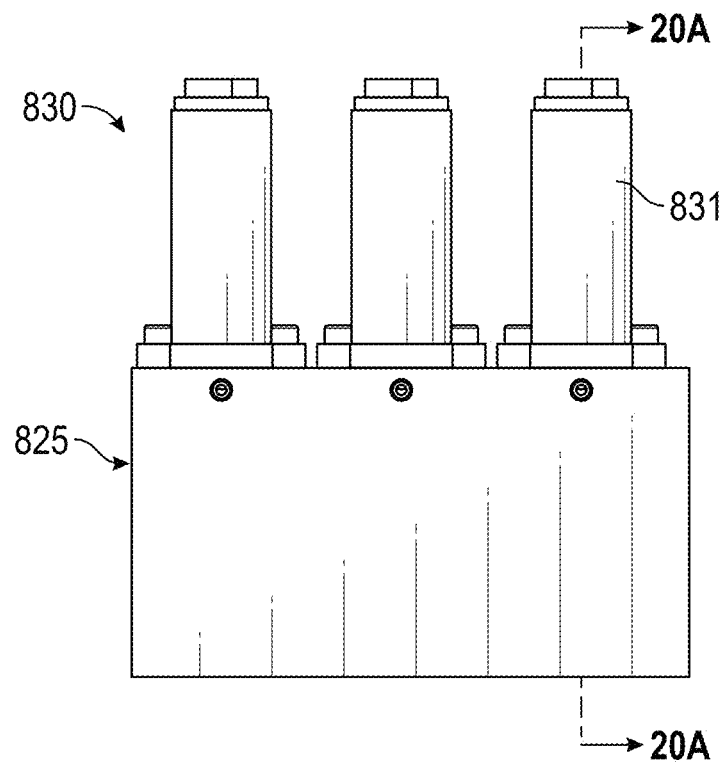
FIG. 19A shows a side view of the subplate mounted valve.
Figure 19B:
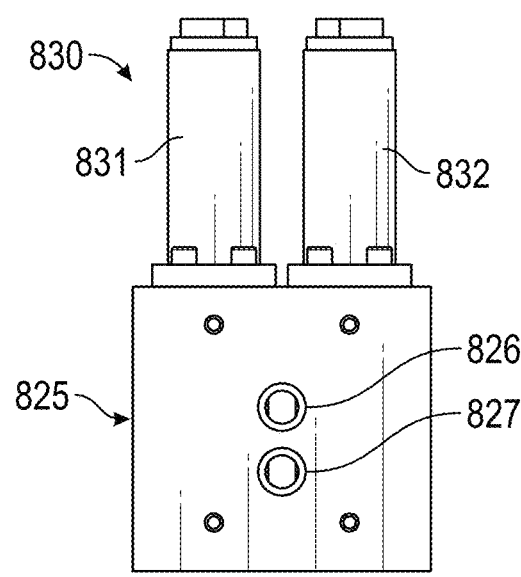
FIG. 19B shows an end view of the subplate mounted valve.

As shown in FIG. 18C, the manifold 825 can include a common supply passage 826 for a hydraulic supply fluid for each of the SPV 830. The manifold 825 can also include a common return passage 827 for a hydraulic return fluid for each of the SPV 830. The supply passage 826 and the return passage 827 can extend through a single face 822b of the housing 822. The PRR 920 can include an output passage 926 for an hydraulic supply fluid. The output passage 926 can be connected with the slider/valve assembly of the PRR 920, as described further below. The PRR 920 can include the return passage 927 for the hydraulic return fluid.

The PRR 920 can be assembled with the manifold 825. The face 822b can abut a face 922b of the housing 922. The output passage 926 can be connected with the supply passage 826. The supply passages 826 and output passage 926 can include a connecting sleeve 826a, which may include one or more O-rings for connecting between the housing 822 and the housing 922. The return passage 927 can be connected with the return passage 827. The return passage 827 and return passage 927 can include a connecting sleeve 827a, which may include one or more O-rings for connecting between the housing 822 and the housing 922.

The plurality of SPV 830 can be arranged in pairs, such as the valves 831, 832. As shown in FIGS. 19A-20C, the valves 831, 832 can operate to route the hydraulic supply fluid and the hydraulic return fluid, similar to the DCV 330, but with two separate actuating valves. This arrangement leads to a simpler design that is easier to actuate using the pilots 891.

The SPV 831 can include a valve section 823. The valve section 823 can be generally cylindrical to fit within a valve cavity 831a in the manifold 825. The valve section 823 can include a supply port 850. The supply port 850 can be in communication with the supply passage 826. The supply port 850 can be structured like the port 340, described above. The supply port 850 can include a first ring holder 851, a first ring 852, a second ring holder 853, a second ring 854, O-rings, spacers, and/or wave springs. The valve section 823 can include first and second apertures for holding the first and second ring holder 851, 853. The first and second apertures can be aligned along a single axis. The first and second ring holder 851, 853 can be installed in respective first and second apertures. The rings 852, 854 can be assembled within the respective ring holders 851, 853.

The valve section 823 can include a return port 840. The return port 840 can be in communication with the return passage 827. The return port 840 can be structured like the port 340, described above. The return port 840 can include a first ring holder 841, a first ring 842, a second ring holder 843, a second ring 844, O-rings, spacers, and/or wave springs. The valve section 823 can include third and fourth apertures for holding the first and second ring holder 841, 843. The third and fourth apertures can be aligned along a single axis. The first and second ring holder 841, 843 can be installed in respective third and fourth apertures. The rings 842, 844 can be assembled within the respective ring holders 841, 843.

Figure 20A:
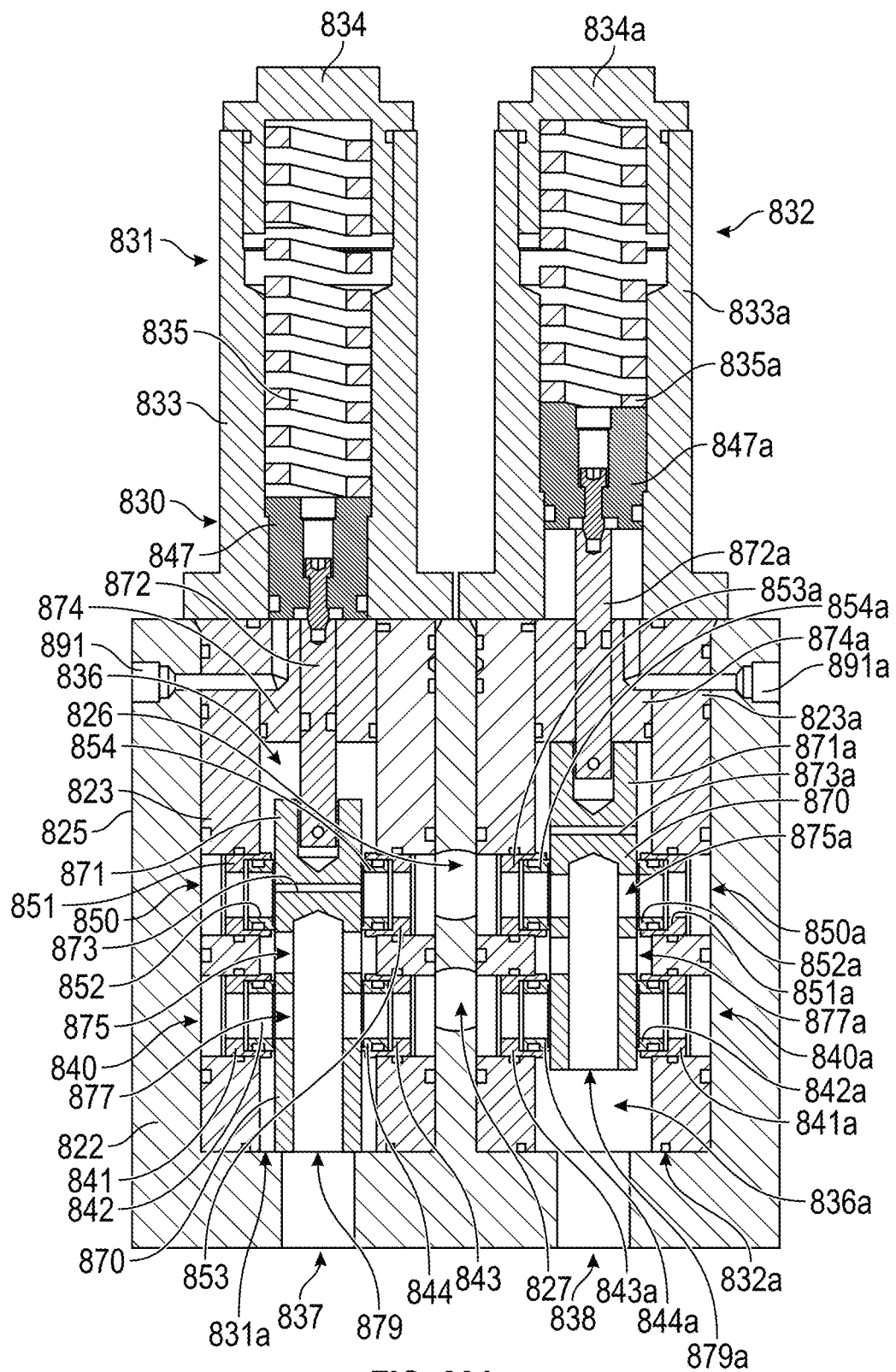
FIG. 20A shows a cross-section of the subplate mounted valve taken on the line 20A-20A in FIG. 19A.

The valve section 823 can include a slider 870. The slider 870 can be located within an interior space 836 of the valve section 823. The slider 870 can be moveable along a first axis (e.g. up and down, as shown in FIG. 20A). The slider 870 can include a first side and a second side. The first and second sides can include lapped, planar surfaces. The first and second sides can be in sliding contact with the respective first rings 842, 852 and second rings 844, 854. The first and second sides can be sealed against the respective first rings 842, 852 and second rings 844, 854 in a metal-to-metal seal.

The slider 870 can include a blocked passage 873, a first aperture 875, and/or a second aperture 877. The first aperture 875 can be in communication with an internal passage 879. The internal passage 879 can be in communication with the interior space 836. The internal passage 879 can include an aperture on a second end of the slider 870 (e.g., opposite the first end 871). The interiors space 836 can be in communication with a first work port 837 in the housing 822. The first work port 837 can be connect with an actuator of a BOP. The first and second apertures 875, 877 can be spaced apart a distance less than or greater than a spacing between the supply port 850 and the return port 840. The blocked passage 873 can extend from the first side to the second side of the slider 870.

Figure 20B:
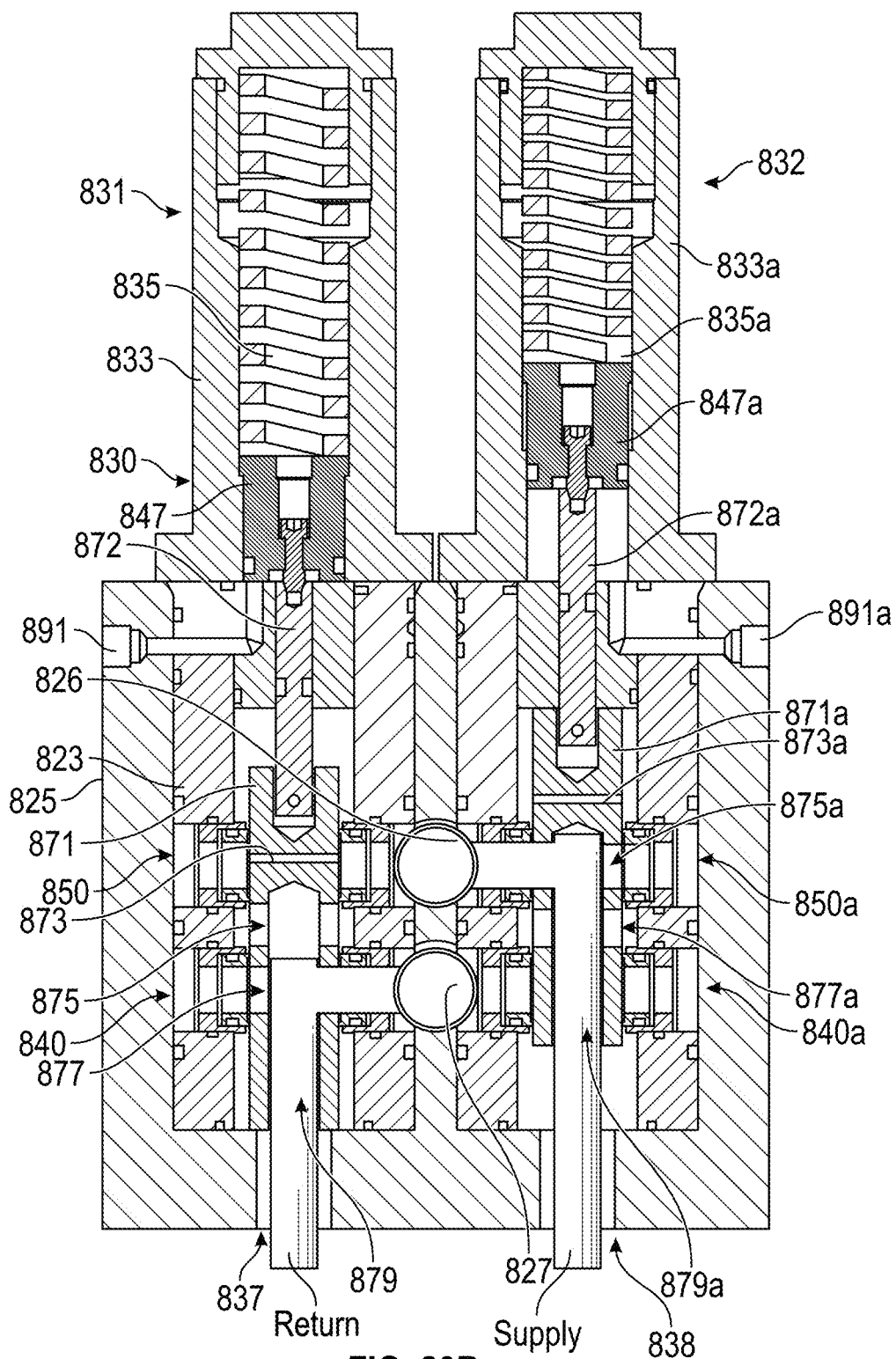
FIG. 20B shows a first configuration of the subplate mounted valve.

The slider 870 can be movable between a lowered position and a raised position of the slider 870 within the valve section 823, as shown in FIG. 20B. The lowered position can be a return configuration. In the lowered position, the second aperture 877 of the slider 870 can be aligned with the return port 840 to form a first return flow path. The first return flow path can connect the first work port 837 with the return passage 827 through the internal passage 879 and the return port 840. The first work port 837 can be hydraulically coupled with the BOP actuator to receive a hydraulic return fluid on the first return flow path. In the first configuration, the blocked passage 873 can be aligned with the supply port 850.

Figure 20C:
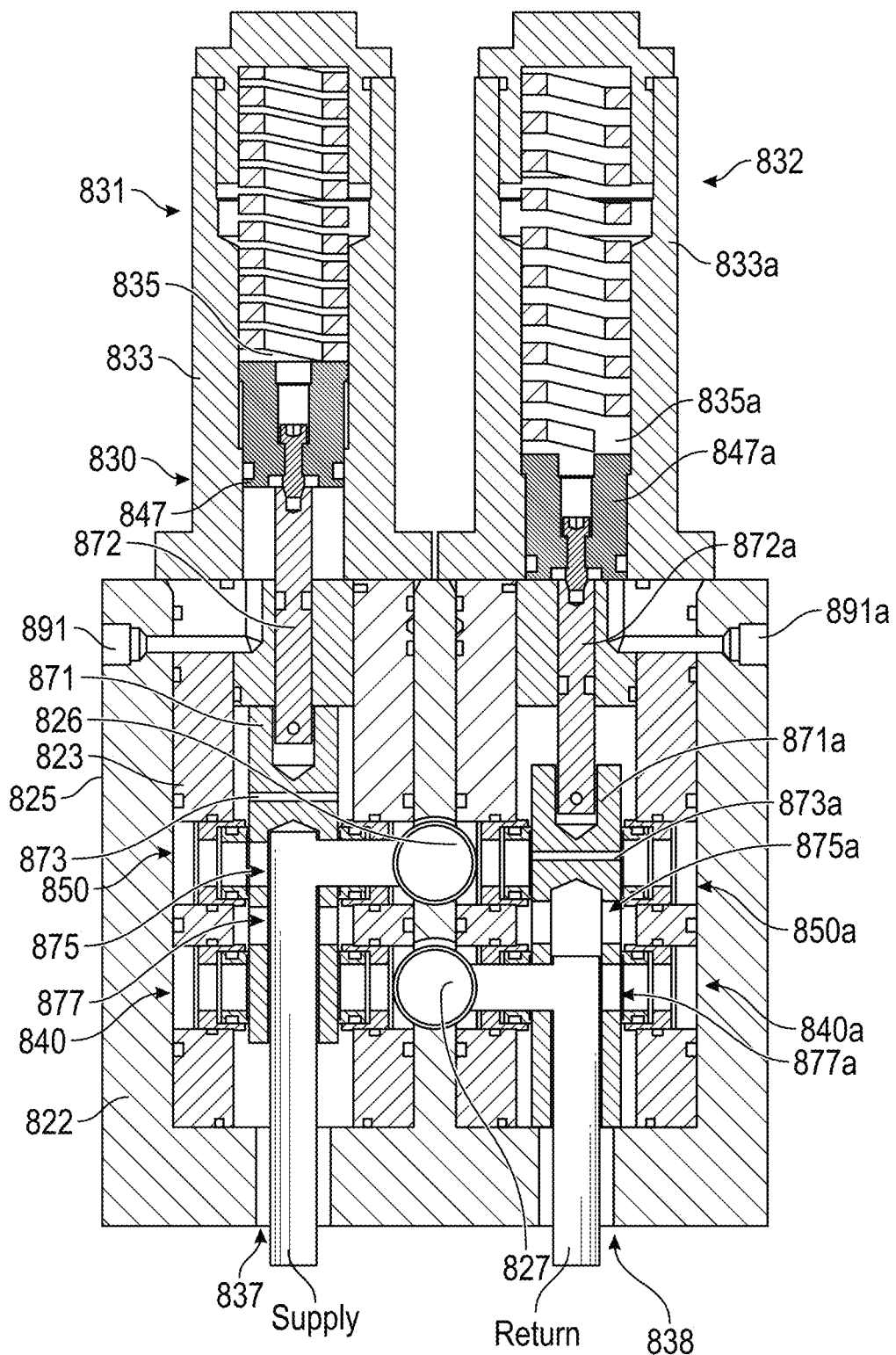
FIG. 20C shows a second configuration of the subplate mounted valve.

The raised position of the slider 870 within the valve section 823, as shown in FIG. 20C, can be a supply configuration. In the raised position, the first aperture 875 of the slider 870 can be aligned with the supply port 850 to form a first supply flow path. The first supply flow path can connect the second work port 837 with the supply passage 826 through the internal passage 879 and the supply port 850. The second work port 837 can be hydraulically coupled with the BOP actuator to receive a hydraulic supply fluid on the first supply flow path. In the second configuration, the return port 840 can be blocked (e.g., by the slider 870).

The SPV 831 can include a control section 833. The control section 833 can include a cylinder containing a piston member 847. The cylinder can be capped on one end with a cap 834. The cap 834 can include one or more threads to engage with the cylinder. The piston member 847 can be coupled with a first end 871 of the slider 870 through a shaft 872. The shaft 872 can pass through one or more piston guides and/or seals 872 between the valve section 823 and the control section 833. The cylinder containing the piston member 847 can be in communication with the pilot port 891. The piston 847 can be movable based on pressure applied to the pilot port 891. The pressure applied to the pilot port 891 can accordingly be used to move the slider 870 into the raised position. The cylinder can further include a spring 835. The spring 835 can bias the piston into the lowered configuration. The spring 835 can be at least partially within the cap 834. The cap 834 can retain the spring 835 within the cylinder of the control section 833. Alternatively, the piston 347 and cylinder can be double acting, as describe further below in relation to FIG. 22.

The SPV 832 can be structured the same as the SPV 831. The SPV 832 can include a valve section 823a, that fits within a valve cavity 832a in the manifold 825. The valve section 823a can include a supply port 850a in communication with the supply passage 826. The supply port 850a can include a first ring holder 851a, a first ring 852a, a second ring holder 853a, a second ring 854a, O-rings, spacers, and/or wave springs. The valve section 823a can include first and second apertures for holding the first and second ring holder 851a, 853a. The rings 852a, 854a can be assembled within the respective ring holders 851a, 853a. The valve section 823a can include a return port 840a. The return port 840a can be in communication with the return passage 827. The return port 840a can include a first ring holder 841a, a first ring 842a, a second ring holder 843a, a second ring 844a, O-rings, spacers, and/or wave springs.

The valve section 823a can include a slider 870a. The slider 870a can be located within an interior space 836a of the valve section 823a. The slider 870 can be moveable along a first axis (e.g. up and down, as shown in FIG. 20A). The slider 870a can include a first side and a second side. The first and second sides can include lapped, planar surfaces. The first and second sides can be in sliding contact with the respective first rings 842a, 852a and second rings 844a, 854a. The first and second sides can be sealed against the respective first rings 842a, 852a and second rings 844a, 854a in a metal-to-metal seal.

The slider 870a can include a blocked passage 873a, a first aperture 875a, and/or a second aperture 877a. The first aperture 875a can be in communication with an internal passage 879a. The internal passage 879a can be in communication with the interior space 836a. The interiors space 836a can be in communication with a second work port 838 in the housing 822. The second work port 838 can be connect with the actuator of a BOP (the same as the first work port 837).

The SPV 832 can include a control section 833a to move the slider 870 between raised and lowered positions. The control section 833a can include a cylinder containing a piston member 847a. The cylinder of the control section 833a can include a cap 834a. The piston member 847a can be coupled with a first end 871a of the slider 870a through a shaft 872a. The cylinder containing the piston member 847a can be in communication with the pilot port 891a. The piston 847a can be movable based on pressure applied to the pilot port 891a to move the slider 870 in the valve section 823. The pressure applied to the pilot port 891a can be used to move the slider 870a into the raised position. The cylinder can further include a spring 835a. The spring 835a can bias the piston into the lowered position. The shaft 872a can pass through one or more piston guides and/or seals 874a between the valve section 823a and the control section 833a.

The slider 870a can be movable between the lowered position and the raised position within the valve section 823a. The lowered position can be a return configuration. In the lowered position, the second aperture 877a of the slider 870a can be aligned with the return port 840a to form a second return flow path. The second return flow path can connect the second work port 838 with the return passage 827 through the internal passage 879a and the return port 840a. The second work port 838 can be hydraulically coupled with the BOP actuator to receive a hydraulic return fluid on the second return flow path.

The raised position of the slider 870a within the valve section 823a, as shown in FIG. 20B, can be a supply configuration. In the raised position, the first aperture 875a of the slider 870a can be aligned with the supply port 850a to form a second supply flow path. The second supply flow path can connect the second work port 838 with the supply passage 826 through the internal passage 879a and the supply port 850a. The second work port 838 can be hydraulically coupled with the BOP actuator to receive a hydraulic supply fluid on the second supply flow path.

The positions of the sliders 870, 870a can be coordinated to provide both supply and return flow paths for the actuator of the BOP. In a first configuration, as shown in FIG. 20B, the slider 870 of the SPV 831 can be lowered and the slider 870a of the SPV 832 can be raised (e.g., by application of the pilot pressure). In the first configuration, the hydraulic supply fluid can pass along the second supply flow path (through supply port 850a) and the hydraulic return fluid can pass along the first return flow path (through return port 840). In a second configuration, as shown in FIG. 20C, the slider 870 of the SPV 831 can be raised (e.g., by application of the pilot pressure) and the slider 870a of the SPV 832 can be lowered. In the second configuration, the hydraulic supply fluid can pass along the first supply flow path (through supply port 850) and the hydraulic return fluid can pass along the second return flow path (through return port 840a).

According to one aspect, the design of the SPV 830 advantageously requires only one pilot hole. In contrast, other valve designs require two pilot signals per valve which doubles the complexity and expense of the pilot control system. According to another aspect, the design of the SPV 830 advantageously require removal of only a few fasteners to remove and replace a valve. Moreover, piping of the manifold 825 does not have to be disturbed for removal or replacement.

Figure 21B:
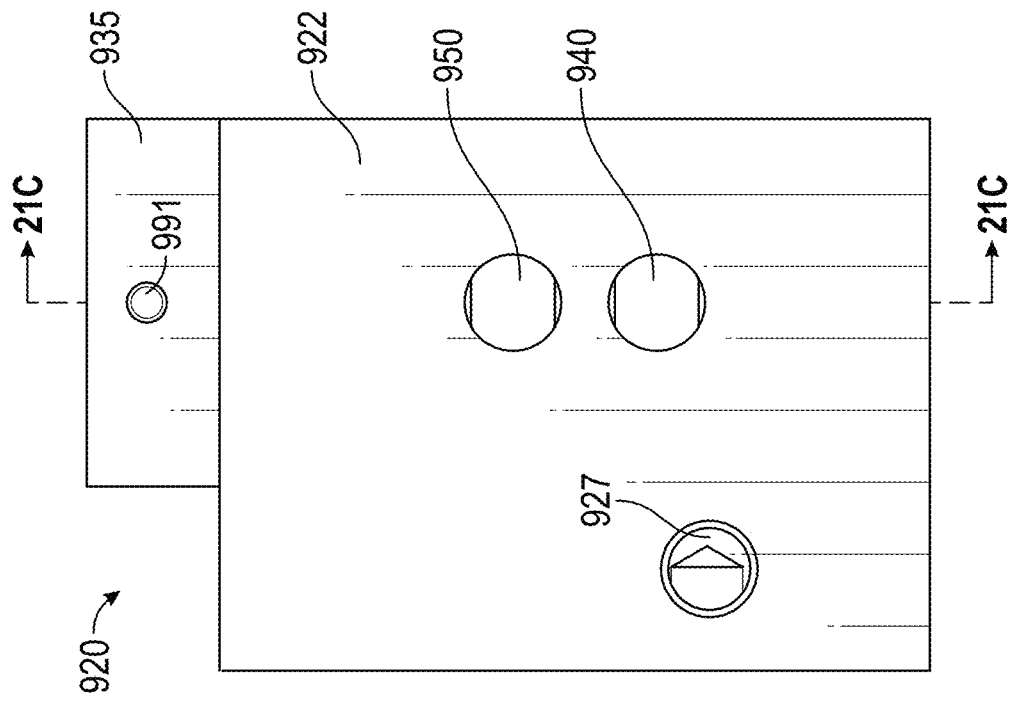
FIG. 21B shows an end view of the pressure regulating and reducing valve.
Figure 21A:
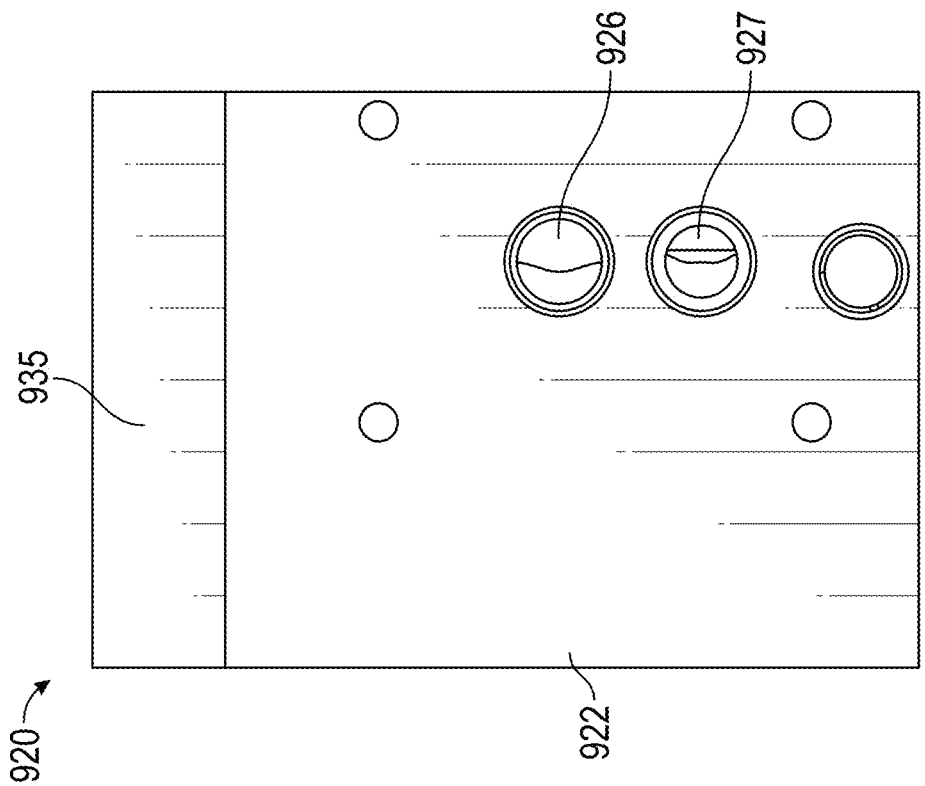
FIG. 21A shows a side view of a pressure regulating and reducing valve of the manifold assembly.
Figure 21C:
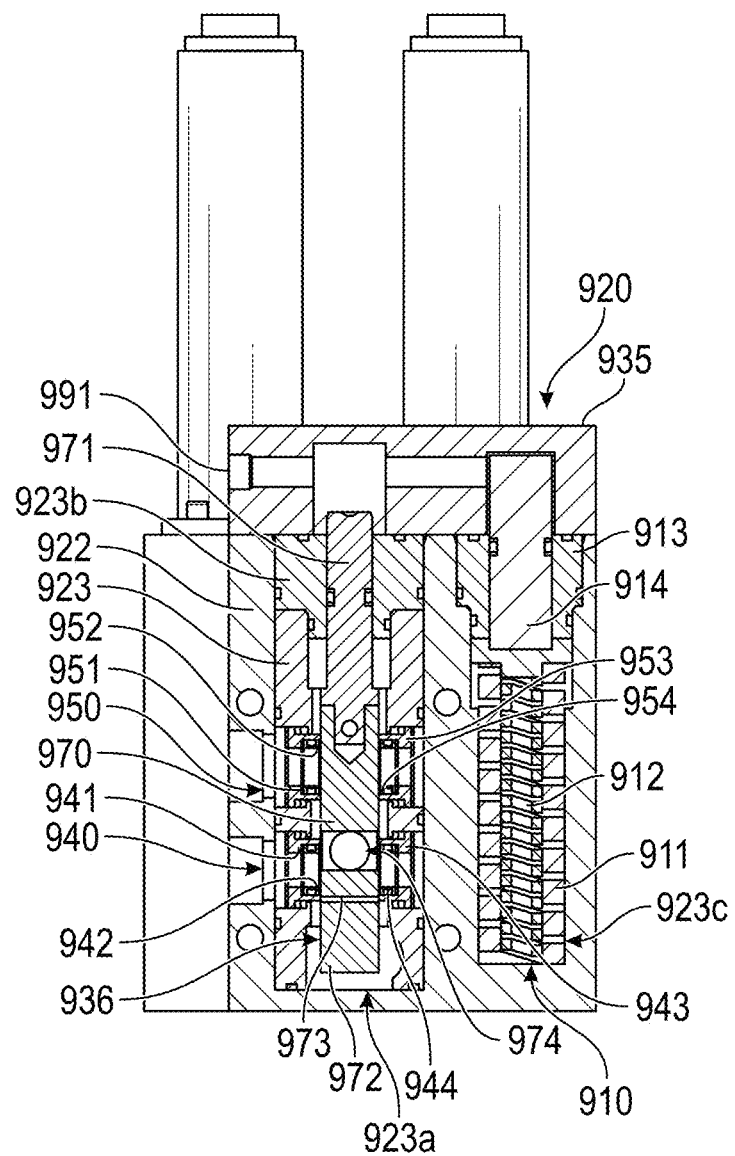
FIG. 21C shows a section view taken along the line 21C-21C in FIG. 21B.

FIGS. 21A-C show further detail of the PRR 920. The PRR 920 can function like the PRR 520 by receiving a hydraulic supply fluid and outputting the hydraulic supply fluid at a set pressure (e.g., into the manifold 825). The PRR 920 can include a valve section 923. The valve section 923 can be generally cylindrical to fit within a valve cavity 923a in the housing 922. The valve section 923 can include a supply port 940. The supply port 940 can be in communication with an aperture in the housing 922 for receiving a hydraulic supply fluid from a fluid source (e.g., accumulator 115). The supply port 940 can be structured like the port 340, described above. The supply port 940 can include a first ring holder 941, a first ring 942, a second ring holder 943, a second ring 944, O-rings, spacers, and/or wave springs. The valve section 923 can include first and second apertures for holding the first and second ring holder 941, 943. The first and second apertures can be aligned along a single axis. The first and second ring holder 941, 943 can be installed in respective first and second apertures. The rings 942, 944 can be assembled within the respective ring holders 941, 943.

The valve section 923 can include a vent port 950. The vent port 950 can be structured like the port 340, described above. The vent port 950 can include a first ring holder 951, a first ring 952, a second ring holder 953, a second ring 954, O-rings, spacers, and/or wave springs. The valve section 923 can include third and fourth apertures for holding the first and second ring holders 951, 953. The third and fourth apertures can be aligned along a single axis. The first and second ring holders 951, 953 can be installed in respective third and fourth apertures. The rings 952, 954 can be assembled within the respective ring holders 951, 953.

The valve section 923 can include a slider 970. The slider 970 can be located within an interior space 936 of the valve section 923. The slider 970 can be moveable along a first axis (e.g. up and down, as shown in FIG. 21C). The slider 970 can include a first side and a second side. The first and second sides can include lapped, planar surfaces. The first and second sides can be in sliding contact with the respective first rings 942, 952 and second rings 944, 954. The first and second sides can be sealed against the respective first rings 942, 952 and second rings 944, 954 in a metal-to-metal seal.

The slider 970 can include a blocked passage 973. The blocked passage 973 can extend from the first to the second side of the slider 970. The slider 970 can include a first aperture 974. The first aperture 974 can extend from the first to the second side of the slider 970. The first aperture 974 can also be in communication with an interior space 936 of the valve section 923. The interior space 936 can be in communication with the supply passage 926.

The slider 970 can include a first end coupled with a shaft 971. The shaft 971 can extend through an piston guide 923b of the valve section 923 into the pilot port 991. The piston guide 923b can include one or more seals to isolate the interior space 936 from the pilot port 991.

The pilot port 991 can receive a fluid at a set pressure. The fluid can provide a set force against the shaft 971 to position the slider 970. Like the PRR 520, the slider 970 can move between a blocked configuration, an open configuration and a venting configuration. The position of the slider 970 can depend on the interaction of the set pressure in the pilot port 991 and the pressure in the interior space 936. In the blocked configuration, the slider 970 is positioned so that the blocked aperture 973 is aligned with the supply port 940. The hydraulic supply fluid received at the supply port 940 does not proceed through the supply passage 926 with the slider in the blocked configuration. In the blocked configuration, the force exerted on the slider 970 within the interior space 936 by the pressure of the hydraulic supply fluid contained therein is equal to the set force. In this position, the pressure within the interior space 936 corresponds to the set output pressure for the PRR 920.

In the open configuration, the slider 970 is positioned so that the first aperture 974 is aligned (e.g., at least partially) with the supply port 940. In the open configuration, the second end of the slider 970 may abut the housing 922. The alignment of the supply port 940 with the first aperture 974 allows the pressure of the hydraulic supply fluid to pass into the interior space 936. From the interior space 936, the hydraulic supply fluid can proceed through the supply passage 926. In the open configuration, the vent port 950 can be completely blocked by the slider 970. In the open configuration, the force exerted on the slider 970 within the interior space 936 by the pressure of the hydraulic supply fluid contained therein can be less than the set force of the pilot hole 991. In this position, the pressure within the interior space 936 can be less than the set output pressure. Accordingly, more of the hydraulic supply fluid is allowed to pass through the interior space 936.

In the venting configuration, the slider 970 is positioned so that the first aperture 974 is aligned (e.g., at least partially) with the vent port 950. This allows the pressure of the hydraulic supply fluid within the interior space 936 to vent through the vent port 950. In the venting configuration, the force exerted on the slider 970 within the interior space 936 by the pressure of the hydraulic supply fluid contained therein is greater than the set force of the pilot hole 991. Accordingly, some of the hydraulic supply fluid is allowed to pass through the vent port 950. The vent port 950 can be coupled with a hydraulic fluid tank or vent to the environment.

The PRR 920 can include a fluid accumulator or compensator 910. The accumulator 910 can include a movable member 914, such as a shaft, in communication with the pilot hole 991. One or more springs 911, 912 can be positioned within a valve cavity 923c of the housing 922. The springs 911, 912 can bias the movable member 914 into the pilot hole 991. As the slider 970 moves between the blocked configuration, the open configuration and the venting configuration, the movable member 914 can move in response to accommodate the (incompressible) fluid contained within the pilot hole 991. Accordingly, the slider 970 can move without compressing the fluid in the pilot hole 991.

Figure 22:
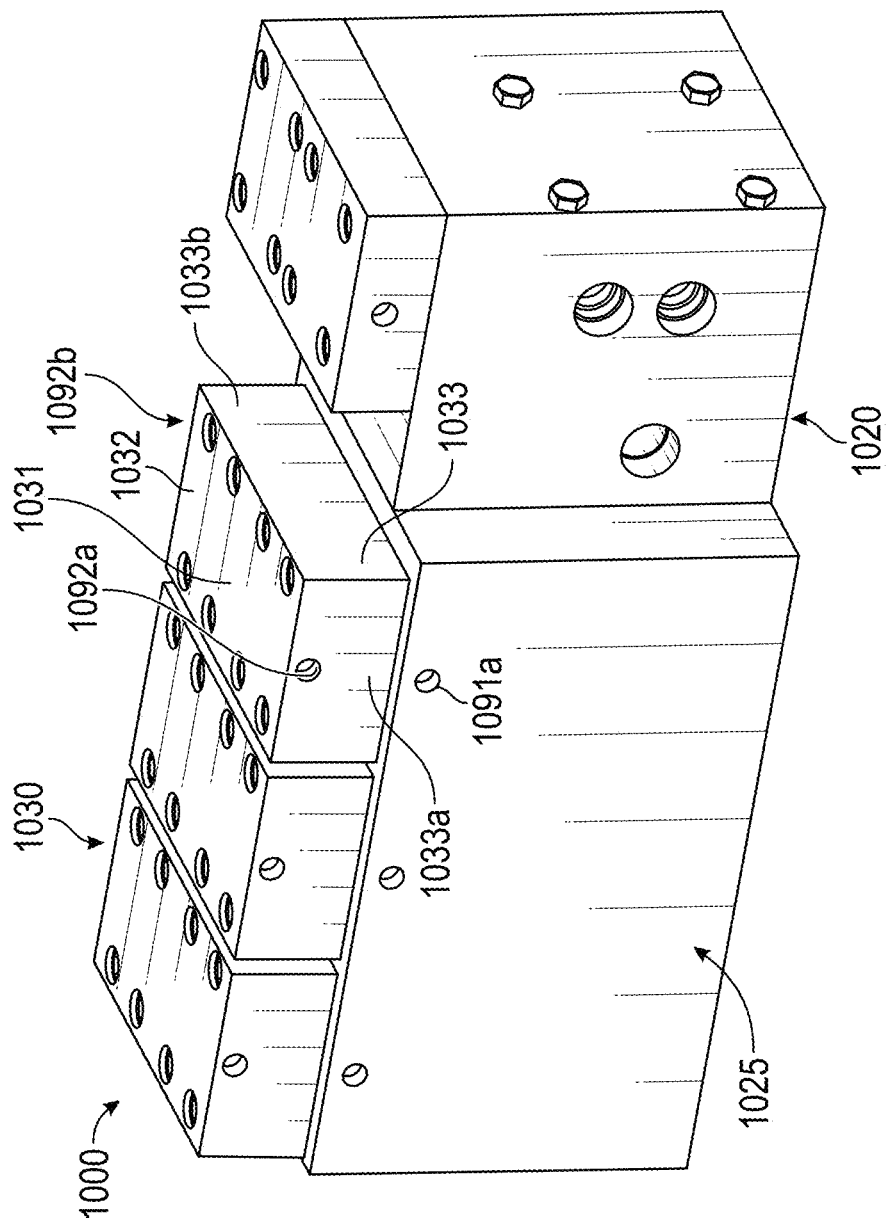
FIG. 22 shows another embodiment of a manifold assembly including pilot-controlled subplate mounted valves.

FIG. 22 shows an alternative embodiment of a manifold assembly 1000, like the manifold assembly 700 with the differences noted below. The manifold assembly 1000 can include a manifold 1025, at least one SPV 1030, and a PRR 1020. The manifold 1025 can include valve cavities containing valve sections of first and second SPV 1031, 1032. Instead of a spring assembly (like SPV 820) the control sections 1033a, 1033b of the respective SPV 1031, 1032 can be contained in a plate 1033. The control section 1033a can include a double-acting piston within a cylinder in the plate 1033 that is positionable by dual pilot ports 1091a, 1092a. Likewise, the control section 1033b can include a double-acting piston within a cylinder in the plate 1033 that is positionable its own respective dual pilot ports. Accordingly, instead of actuating the sliders of the SPV 1031, 1032 using a spring, the sliders can be positionable based on the double acting pistons and pilot ports.

Figure 23:
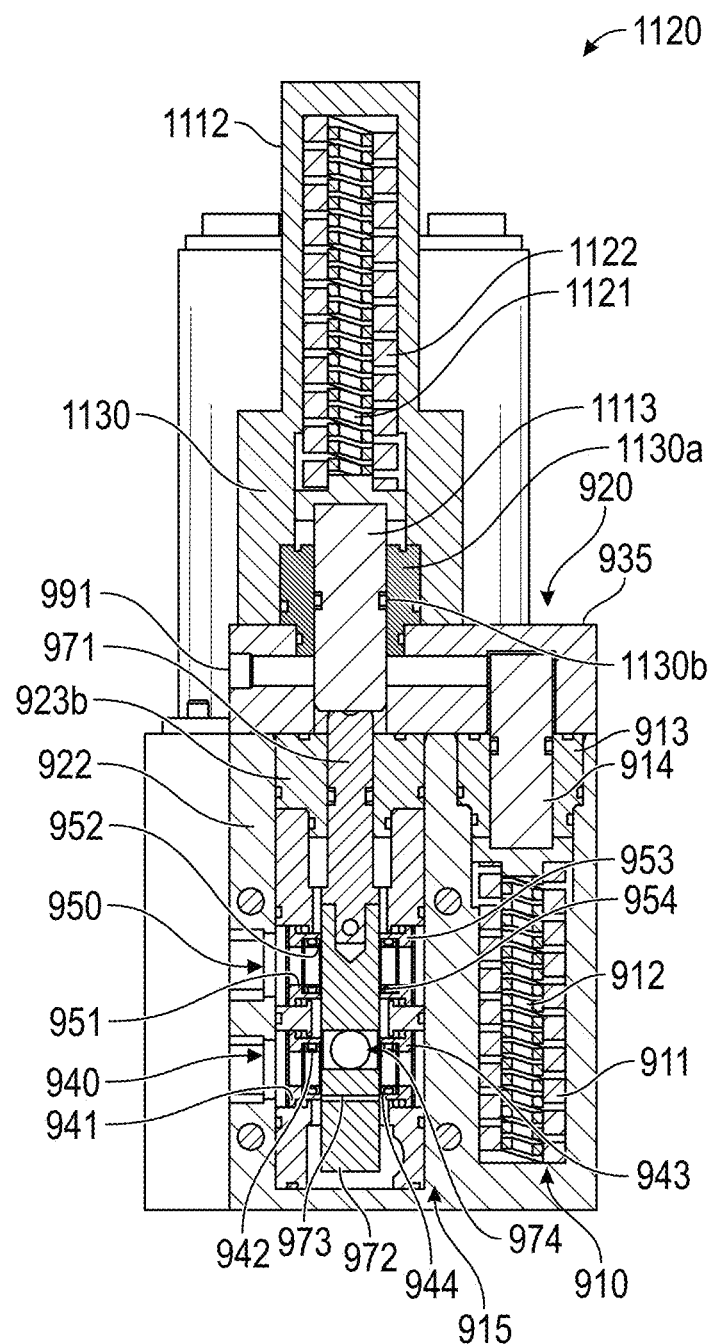
FIG. 23 shows a pressure regulating and reducing valve including a fail-safe mechanism.

FIG. 23 shows an alternative embodiment of the PRR 920 further including a failsafe mechanism 1120. The failsafe mechanism 1120 can include a housing 1130 containing one or more springs 1121, 1122. The springs 1121, 1122 can exert force on a movable member 1113. The movable member 1113 can extend through a guide 1130a including one or more seals (e.g., O-rings and/or backup rings). The movable member 1113 can also include one or more seals 1130b (e.g., O-rings and/or backup rings) engaging with an interior passage of the guide 1130a. The movable member 1113 can be in communication with the pilot port 991. The springs 1121, 1122 can exert a force on the movable member and the pressure of the fluid in the pilot port 991 can counteract the force of from the springs 1121, 1122. If the pressure form the pilot port 991 is lost (e.g., due to malfunction), the movable member 1113 can be biased to contact the shaft 971 or slider 970 to move the slider 970 into the open configuration. Thus, should the pilot pressure fail, all of the pressure from the hydraulic supply fluid can be routed into the manifold 825, through the supply passage 926.

SUMMARY

Several illustrative embodiments of hydraulic components have been disclosed. Although this disclosure has been described in terms of certain illustrative embodiments and uses, other embodiments and other uses, including embodiments and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various embodiments.

All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one embodiment or example in this disclosure can be combined or used with (or instead of) any other portion of any of the steps, processes, structures, and/or devices disclosed or illustrated in a different embodiment, flowchart, or example. The embodiments and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any embodiments having equivalent elements, modifications, omissions, and/or combinations are also within the scope of this disclosure. Moreover, although certain aspects, advantages, and novel features are described herein, not necessarily all such advantages may be achieved in accordance with any particular embodiment. For example, some embodiments within the scope of this disclosure achieve one advantage, or a group of advantages, as taught herein without necessarily achieving other advantages taught or suggested herein. Further, some embodiments may achieve different advantages than those taught or suggested herein.

Some embodiments have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular embodiment of the inventions disclosed herein. No aspects of this disclosure are essential or indispensable. In many embodiments, the devices, systems, and methods may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible. Any of the features, structures, steps, or processes disclosed in this specification can be included in any embodiment.

In summary, various embodiments and examples of hydraulic components and related methods have been disclosed. This disclosure extends beyond the specifically disclosed embodiments and examples to other alternative embodiments and/or other uses of the embodiments, as well as to certain modifications and equivalents thereof. Moreover, this disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims.

What is claimed is:

1. An oil well BOP assembly coupled with a drill string, comprising:
   a hydraulic pump and a motor for powering the hydraulic pump;
   at least one pressure accumulator tank for providing a flow of pressurized hydraulic fluid;
   at least one conduit hydraulically coupling the hydraulic pump with the at least one pressure accumulator tank;
   a blowout preventer (BOP) including an actuator operable by the flow of pressurized hydraulic fluid;
   a valve controller for delivering the flow of pressurized hydraulic fluid to the BOP comprising:
      a manifold including:
         a first valve cavity including a first BOP port;
         a second valve cavity including a second BOP port;
         a supply port in communication with the first and second valve cavities; and
         a return port in communication with the first and second valve cavities;
      a first cartridge valve having a first end disposed in the first valve cavity and including:
         a housing having an interior space;
         a first port including first and second apertures in the housing, a first ring holder disposed in the first aperture and a first seal ring coupled within the first ring holder, a second ring holder disposed in the second aperture and a second seal ring coupled within the second ring holder;
         a second port, including third and fourth apertures in the housing, a third ring holder disposed in the third aperture and a third seal ring coupled within the third ring holder, a fourth ring holder disposed in the fourth aperture and a fourth seal ring coupled within the fourth ring holder; and
         a first slide disposed within the interior space and movable along a first linear axis, the first slide including a first side and a second side opposite the first side, a closed valve aperture, and an open valve aperture in communication with the first BOP port;
         wherein the first side of the first slide sealingly engages with the first and third sealing rings, and the second side of the first slide sealingly engages with the second and fourth sealing rings, the first slide slideable along the first linear axis between a return position, in which the closed valve aperture is aligned with the first port and the open valve aperture is aligned with the second port, and a supply position, in which the open valve aperture is aligned with the first port;
      a second cartridge valve having a first end disposed in the second valve cavity and including:
         a housing having an interior space;
         a first port including first and second apertures in the housing, a first ring holder disposed in the first aperture and a first seal ring coupled within the first ring holder, a second ring holder disposed in the second aperture and a second seal ring coupled within the second ring holder;
         a second port, including third and fourth apertures in the housing, a third ring holder disposed in the third aperture and a third seal ring coupled within the third ring holder, a fourth ring holder disposed in the fourth aperture and a fourth seal ring coupled within the fourth ring holder; and
         a second slide disposed within the interior space and movable along a second linear axis, the second slide including a first side and a second side opposite the first side, a closed valve aperture, and an open valve aperture in communication with the second BOP port;
         wherein the first side of the second slide sealingly engages with the first and third sealing rings, and the second side of the first slide sealingly engages with the second and fourth sealing rings, the second slide slideable along the second linear axis between a return position, in which the closed valve aperture is aligned with the first port and the open valve aperture is aligned with the second port, and a supply position, in which the open valve aperture is aligned with the first port;
   wherein the first end of the first cartridge valve is installed within the first valve cavity with the first port in communication with the supply port and the second port in communication with the return port;
   wherein the first end of the second cartridge valve is installed within the second valve cavity with the first port in communication with the supply port and the second port in communication with the return port;
   wherein in a first configuration, the first slide is in the supply position to form a first supply flow path for the flow of pressurized hydraulic fluid to the BOP through the first BOP port, and the second slide is in the return position to form a first return flow path for the flow of pressurized hydraulic fluid from the BOP through the second BOP port;
   wherein in a second configuration, the second slide is in the supply position to form a second supply flow path for the flow of pressurized hydraulic fluid to the BOP through the second BOP port, and the first slide is in the return position to form a second return flow path for the flow of pressurized hydraulic fluid from the BOP through the first BOP port.

2. The BOP assembly of claim 1, wherein an equal pressure is applied on the first and second sides of the first slide by the flow of pressurized hydraulic fluid in both the supply and return positions.

3. The BOP assembly of claim 1, wherein the first and second BOP ports are coupled with the actuator of the BOP.

4. The BOP assembly of claim 1, wherein a second end of the first cartridge valve includes a slide actuator for moving the first slide between the supply and return positions.

5. The BOP assembly of claim 4, wherein the slide actuator includes a cylinder having a piston disposed therein, the piston coupled with the first slide.

6. The BOP assembly of claim 5, wherein the valve controller includes a pilot port, the pilot port in communication with the cylinder of the slide actuator and configured to move the piston and the first slide.

7. The BOP assembly of claim 5, further comprising a spring for biasing the first slide into a blocked position.

8. The BOP assembly of claim 1, further comprising third and fourth valve cavities with respective third and fourth cartridge valves.

* * * * *